(12) United States Patent
Weder

(10) Patent No.: US 8,413,375 B2
(45) Date of Patent: *Apr. 9, 2013

(54) COMPRESSED PACKAGED ARTICLES AND METHODS OF MAKING, TRANSPORTING, SHIPPING AND USING SAME

(75) Inventor: Donald E. Weder, Highland, IL (US)

(73) Assignee: Wanda M. Weder & William F. Straeter, Highland, IL (US), not individually but solely as Trustees of The Family Trust U/T/A dated Dec. 8, 1995.

( * ) Notice: Subject to any disclaimer, the term of this patent is extended or adjusted under 35 U.S.C. 154(b) by 0 days.

This patent is subject to a terminal disclaimer.

(21) Appl. No.: 13/429,836

(22) Filed: Mar. 26, 2012

(65) Prior Publication Data

US 2012/0174532 A1 Jul. 12, 2012

Related U.S. Application Data

(63) Continuation of application No. 13/160,003, filed on Jun. 14, 2011, now Pat. No. 8,171,670, which is a continuation of application No. 12/378,564, filed on Feb. 17, 2009, now Pat. No. 8,015,751, which is a continuation of application No. 11/100,205, filed on Apr. 6, 2005, now abandoned.

(60) Provisional application No. 60/644,544, filed on Jan. 18, 2005.

(51) Int. Cl.
    *A01G 9/02* (2006.01)
(52) U.S. Cl.
    USPC .................................................. 47/72
(58) Field of Classification Search ............... 47/72
    See application file for complete search history.

(56) References Cited

U.S. PATENT DOCUMENTS

| | | | |
|---|---|---|---|
| 524,219 A | 8/1894 | Schmidt |
| 732,889 A | 7/1903 | Paver |
| 950,785 A | 3/1910 | Pene |
| 1,044,260 A | 11/1912 | Schloss |
| 1,063,154 A | 5/1913 | Bergen |
| 1,398,030 A | 11/1921 | Luellen |
| 1,446,563 A | 2/1923 | Hughes |
| 1,520,647 A | 12/1924 | Hennigan |
| 1,525,015 A | 2/1925 | Weeks |

(Continued)

FOREIGN PATENT DOCUMENTS

| | | |
|---|---|---|
| AU | 4231978 | 6/1979 |
| BE | 654427 | 1/1965 |

(Continued)

OTHER PUBLICATIONS

Speed Cover Brochure, "The Simple Solution for Those Peak Volume Periods", Highland Supply Corporation, © 1989, 6 pages.

(Continued)

*Primary Examiner* — Frank T Palo
(74) *Attorney, Agent, or Firm* — Dunlap Codding, PC

(57) ABSTRACT

The present inventive concept(s) relates, in general, to articles that are packaged in a compressed state relative to an uncompressed fully articulated state and methods of making and using same. In a specific embodiment, but not to be considered as limiting, the articles so packaged in a compressed state are plant covers that are either substantially rigid and/or substantially flexible.

14 Claims, 17 Drawing Sheets

U.S. PATENT DOCUMENTS

| | | |
|---|---|---|
| 1,610,652 A | 12/1926 | Bouchard |
| 1,697,751 A | 1/1929 | Blake |
| 1,794,212 A | 1/1929 | Snyder |
| 1,811,574 A | 3/1930 | Barrett |
| 1,846,585 A | 2/1932 | Clark |
| 1,863,216 A | 6/1932 | Wordingham |
| 1,909,013 A | 5/1933 | Ruzicka |
| 1,978,631 A | 10/1934 | Herrlinger |
| 2,048,123 A | 7/1936 | Howard |
| RE21,065 E | 5/1939 | Copeman |
| 2,170,147 A | 8/1939 | Lane |
| 2,200,111 A | 5/1940 | Bensel |
| 2,278,673 A | 4/1942 | Savada et al. |
| 2,302,259 A | 11/1942 | Rothfuss |
| 2,323,287 A | 7/1943 | Amberg |
| 2,355,559 A | 8/1944 | Renner |
| 2,371,985 A | 3/1945 | Freiberg |
| 2,411,328 A | 11/1946 | MacNab |
| 2,510,120 A | 6/1950 | Leander |
| 2,529,060 A | 11/1950 | Trillich |
| 2,621,142 A | 12/1952 | Wetherell |
| 2,648,487 A | 8/1953 | Linda |
| 2,688,354 A | 9/1954 | Berger |
| 2,688,914 A | 9/1954 | Eckler |
| 2,774,187 A | 12/1956 | Smithers |
| 2,822,287 A | 2/1958 | Avery |
| 2,846,060 A | 8/1958 | Yount |
| 2,850,842 A | 9/1958 | Eubank, Jr. |
| 2,883,262 A | 4/1959 | Borin |
| 2,962,848 A | 12/1960 | Wilson |
| 2,989,828 A | 6/1961 | Warp |
| 3,003,681 A | 10/1961 | Orsini |
| 3,022,605 A | 2/1962 | Reynolds |
| 3,080,680 A | 3/1963 | Reynolds et al. |
| 3,094,810 A | 6/1963 | Kalpin |
| 3,121,647 A | 2/1964 | Harris et al. |
| 3,130,113 A | 4/1964 | Silman |
| 3,172,796 A | 3/1965 | Gülker |
| 3,197,062 A | 7/1965 | Day |
| 3,271,922 A | 9/1966 | Wallerstein et al. |
| 3,293,100 A | 12/1966 | Questel |
| 3,316,675 A | 5/1967 | Cartwright, Jr. |
| 3,322,325 A | 5/1967 | Bush |
| 3,357,152 A | 12/1967 | Geigel |
| 3,375,607 A | 4/1968 | Melvoid |
| 3,376,666 A | 4/1968 | Leonard |
| 3,380,646 A | 4/1968 | Doyen et al. |
| 3,405,863 A | 10/1968 | Kugler |
| 3,431,706 A | 3/1969 | Stuck |
| 3,480,179 A | 11/1969 | Rowland |
| 3,508,372 A | 4/1970 | Wallerstein et al. |
| 3,510,054 A | 5/1970 | Sanni et al. |
| 3,512,700 A | 5/1970 | Evans et al. |
| 3,550,318 A | 12/1970 | Remke et al. |
| 3,552,059 A | 1/1971 | Moore |
| 3,554,434 A | 1/1971 | Anderson |
| 3,556,389 A | 1/1971 | Gregoire |
| 3,557,516 A | 1/1971 | Brandt |
| 3,613,309 A | 10/1971 | Coburn |
| 3,620,366 A | 11/1971 | Parkinson |
| 3,681,105 A | 8/1972 | Milutin et al. |
| 3,739,522 A | 6/1973 | Greenbaum |
| 3,767,104 A | 10/1973 | Bachman et al. |
| 3,793,799 A | 2/1974 | Howe et al. |
| 3,804,322 A | 4/1974 | Ericson |
| 3,869,828 A | 3/1975 | Matsumoto |
| 3,872,621 A | 3/1975 | Greenbaum |
| 3,888,443 A | 6/1975 | Flanigen |
| 3,962,503 A | 6/1976 | Crawford |
| 4,043,077 A | 8/1977 | Stonehocker |
| 4,054,697 A | 10/1977 | Reed et al. |
| 4,091,925 A | 5/1978 | Griffo et al. |
| 4,113,100 A | 9/1978 | Soja et al. |
| 4,118,890 A | 10/1978 | Shore |
| 4,149,339 A | 4/1979 | Hall et al. |
| 4,170,618 A | 10/1979 | Adams |
| 4,189,868 A | 2/1980 | Tymchuck et al. |
| 4,216,620 A | 8/1980 | Weder et al. |
| 4,248,347 A | 2/1981 | Trimbee |
| 4,258,501 A | 3/1981 | Brown |
| D259,333 S | 5/1981 | Charbonneau |
| 4,265,049 A | 5/1981 | Gorewitz |
| 4,280,314 A | 7/1981 | Stuck |
| 4,297,811 A | 11/1981 | Weder |
| 4,299,056 A | 11/1981 | Towning |
| 4,333,267 A | 6/1982 | Witte |
| 4,347,686 A | 9/1982 | Wood |
| 4,380,564 A | 4/1983 | Cancio et al. |
| 4,400,910 A | 8/1983 | Koudstall et al. |
| 4,413,725 A | 11/1983 | Bruno et al. |
| 4,508,223 A | 4/1985 | Catrambone |
| D279,279 S | 6/1985 | Wagner |
| 4,546,875 A | 10/1985 | Zweber |
| 4,570,423 A | 2/1986 | DeLong |
| 4,621,733 A | 11/1986 | Harris |
| 4,640,079 A | 2/1987 | Stuck |
| 4,674,972 A | 6/1987 | Wagner |
| 4,692,111 A | 9/1987 | Wagner |
| 4,717,262 A | 1/1988 | Roen et al. |
| 4,733,521 A | 3/1988 | Weder et al. |
| 4,765,464 A | 8/1988 | Ristvedt |
| 4,771,573 A | 9/1988 | Stengel |
| 4,773,182 A | 9/1988 | Weder et al. |
| 4,801,014 A | 1/1989 | Meadows |
| 4,810,109 A | 3/1989 | Castel |
| 4,835,834 A | 6/1989 | Weder |
| D301,991 S | 7/1989 | Van Sant |
| D304,317 S | 10/1989 | Wagner |
| 4,897,031 A | 1/1990 | Weder |
| 4,900,390 A | 2/1990 | Colton et al. |
| 4,918,861 A | 4/1990 | Carpenter |
| 4,941,572 A | 7/1990 | Harris |
| 4,946,290 A | 8/1990 | Matyja |
| 4,980,209 A | 12/1990 | Hill |
| 4,989,396 A | 2/1991 | Weder et al. |
| D315,700 S | 3/1991 | Stephens |
| 5,073,161 A | 12/1991 | Weder et al. |
| 5,074,675 A | 12/1991 | Osgood |
| 5,076,011 A | 12/1991 | Stehouwer |
| 5,105,599 A | 4/1992 | Weder |
| 5,111,638 A | 5/1992 | Weder |
| 5,117,584 A | 6/1992 | Ottenwalder |
| 5,120,382 A | 6/1992 | Weder |
| 5,152,100 A | 10/1992 | Weder et al. |
| 5,181,364 A | 1/1993 | Weder |
| D335,105 S | 4/1993 | Ottenwalder et al. |
| 5,199,242 A | 4/1993 | Weder et al. |
| 5,205,108 A | 4/1993 | Weder et al. |
| 5,208,027 A | 5/1993 | Weder et al. |
| 5,228,234 A | 7/1993 | de Klerk et al. |
| 5,235,782 A | 8/1993 | Landau |
| 5,239,775 A | 8/1993 | Landau |
| 5,241,783 A | 9/1993 | Krueger |
| 5,249,407 A | 10/1993 | Stuck |
| 5,259,106 A | 11/1993 | Weder et al. |
| 5,307,606 A | 5/1994 | Weder |
| 5,315,785 A | 5/1994 | Avôt et al. |
| 5,350,240 A | 9/1994 | Billman et al. |
| 5,353,575 A | 10/1994 | Stepanek |
| 5,361,482 A | 11/1994 | Weder et al. |
| 5,363,592 A | 11/1994 | Weder et al. |
| 5,388,695 A | 2/1995 | Gilbert |
| 5,407,343 A | 4/1995 | Weder et al. |
| 5,428,939 A | 7/1995 | Weder et al. |
| 5,443,670 A | 8/1995 | Landau |
| D362,829 S | 10/1995 | Wagner |
| 5,484,562 A | 1/1996 | Weder et al. |
| 5,493,809 A | 2/1996 | Weder et al. |
| D368,025 S | 3/1996 | Sekerak et al. |
| 5,496,251 A | 3/1996 | Cheng |
| 5,496,252 A | 3/1996 | Gilbert |
| 5,526,932 A | 6/1996 | Weder |
| 5,546,699 A | 8/1996 | Weder et al. |
| 5,551,570 A | 9/1996 | Shaffer et al. |
| 5,572,849 A | 11/1996 | Weder et al. |
| 5,572,851 A | 11/1996 | Weder |
| 5,575,107 A | 11/1996 | Doerr |

| | | |
|---|---|---|
| 5,575,133 A | 11/1996 | Weder et al. |
| 5,617,703 A | 4/1997 | Weder |
| 5,624,320 A | 4/1997 | Martinez |
| 5,625,979 A | 5/1997 | Weder |
| 5,647,168 A | 7/1997 | Gilbert |
| 5,647,193 A | 7/1997 | Weder et al. |
| 5,706,604 A | 1/1998 | Yogi |
| 5,706,605 A | 1/1998 | Alcazar |
| 5,706,945 A | 1/1998 | Saarinen et al. |
| 5,715,944 A | 2/1998 | Windisch |
| 5,735,103 A | 4/1998 | Weder |
| 5,758,472 A | 6/1998 | Weder |
| 5,813,194 A | 9/1998 | Weder |
| D399,787 S | 10/1998 | Wagner |
| D399,788 S | 10/1998 | Wagner |
| 5,832,663 A | 11/1998 | Weder et al. |
| D404,684 S | 1/1999 | Shea |
| D409,057 S | 5/1999 | Wagner |
| 5,906,279 A | 5/1999 | Bergholtz |
| 5,924,241 A | 7/1999 | Hodge |
| 5,934,470 A | 8/1999 | Bauer et al. |
| 5,941,020 A | 8/1999 | Weder |
| D413,547 S | 9/1999 | Wagner |
| D414,085 S | 9/1999 | Campbell |
| 5,966,866 A | 10/1999 | Ferguson |
| 5,974,730 A | 11/1999 | Chien |
| 5,979,145 A | 11/1999 | Louis et al. |
| D419,436 S | 1/2000 | Celtorius et al. |
| 6,009,687 A | 1/2000 | Weder |
| 6,047,524 A | 4/2000 | Weder |
| D424,972 S | 5/2000 | Ferguson |
| 6,071,445 A | 6/2000 | Wagner |
| D428,827 S | 8/2000 | Wagner |
| 6,098,336 A | 8/2000 | Ferguson |
| D431,495 S | 10/2000 | Wagner |
| 6,129,208 A | 10/2000 | Ferguson |
| 6,129,209 A | 10/2000 | Tchira |
| 6,141,906 A | 11/2000 | Weder |
| D435,481 S | 12/2000 | Wagner |
| 6,182,395 B1 | 2/2001 | Weder |
| 6,183,590 B1 | 2/2001 | Weder |
| D448,130 S | 9/2001 | Wagner |
| 6,286,255 B1 | 9/2001 | Weder et al. |
| 6,286,256 B1 | 9/2001 | Weder |
| 6,345,467 B1 | 2/2002 | Weder |
| 6,385,905 B1 | 5/2002 | Weder |
| 6,405,871 B1 | 6/2002 | Craig et al. |
| 6,546,669 B2 | 4/2003 | Weder et al. |
| 6,598,341 B2 | 7/2003 | Weder |
| 8,015,751 B2 * | 9/2011 | Weder ............... 47/72 |
| 2001/0045059 A1 | 11/2001 | Weder et al. |
| 2002/0032983 A1 | 3/2002 | Weder |
| 2003/0121234 A1 | 7/2003 | Weder et al. |
| 2006/0168884 A1 | 8/2006 | Weder |
| 2009/0159480 A1 | 6/2009 | Weder |

FOREIGN PATENT DOCUMENTS

| | | |
|---|---|---|
| CH | 560532 | 4/1975 |
| DE | 15550 | 6/1900 |
| DE | 345464 | 12/1921 |
| DE | 513971 | 11/1930 |
| DE | 1166692 | 3/1964 |
| DE | 1962947 | 6/1971 |
| DE | 2060812 | 11/1971 |
| DE | 2748626 | 5/1979 |
| DE | 3445799 | 6/1986 |
| DE | 3829281 | 5/1989 |
| DE | 3911847 | 10/1990 |
| DK | 1204647 | 9/1970 |
| EP | 0050990 | 5/1982 |
| EP | 0791543 | 8/1997 |
| FR | 1376047 | 9/1964 |
| FR | 2036163 | 12/1970 |
| FR | 2137325 | 12/1972 |
| FR | 2272914 | 12/1975 |
| FR | 2489126 | 3/1982 |
| FR | 2567068 | 7/1984 |
| FR | 2610604 | 8/1988 |
| FR | 2603159 | 3/1989 |
| FR | 2619698 | 3/1989 |
| FR | 2651663 | 3/1991 |
| GB | 5605 | 0/1885 |
| GB | 2055031 | 2/1981 |
| GB | 2056410 | 3/1981 |
| GB | 2074542 | 11/1981 |
| GB | 2094123 | 9/1982 |
| GB | 2128083 | 4/1984 |
| GB | 2203127 | 10/1988 |
| GB | 2212136 | 7/1989 |
| GB | 2252708 | 8/1992 |
| IT | 224507 | 4/1996 |
| JP | 542958 | 2/1993 |
| JP | 6127555 | 5/1994 |
| JP | 8-19334 | 1/1996 |
| NL | 8301709 | 12/1984 |
| NL | 1000658 | 1/1996 |
| WO | 9315979 | 8/1993 |
| WO | 9712819 | 4/1997 |

OTHER PUBLICATIONS

"Speed Sheets and Speed Rolls" Brochure, Highland Supply Corporation, © 1990, 2 pages.
"Color Them Happy with Highlander Products" © 1992.
"Costa Keeps the Christmas Spirit", Supermarket Floral, Sep. 15, 1992, 2 pages.
"Super Seller", Supermarket Floral, Sep. 15, 1992, 2 pages.
"Halloween", Link Magazine, Sep. 1992, 2 pages.
"Now More Than Ever", Supermarket Floral, Sep. 15, 1992, 2 pages.
Le Plant Sac Advertisement, published prior to Sep. 26, 1987.
"A World of Cut Flower and Pot Plant Packaging" Brochure, Klerk's Plastic Products Manufacturing, Inc., published prior to Mar. 31, 1994, 6 pages.
Chantler & Chantler brochure showing Zipper Sleeve™ and Florasheet®, published prior to Mar. 31, 1994, 2 pages.
"Stand Alone Plastic Bagmaking" brochure, AMI, Atlanta, GA, Feb. 15, 1996, 2 pages.
"Foil Jackets" brochure, Custom Medallion, Inc., Dec. 1996, 2 pages.
"Derwent Abstract" of FR 2610604A. It is noted that the abstract is an incorrect English translation of the contents of the French patent. The French patent does not enable or disclose adhesively attaching the covering to the container. 1988.
"Silver Linings" Brochure, Affinity Diversified Industries, Inc., 1986. The Silver Linings brochure shows a floral sleeve with a closed bottom. The brochure shows, in one embodiment, a vase with flowers inside a "cut flower" sleeve with the sleeve tied with a ribbon about the neck of the vase, 2 pages.
"Special Occasion Printed Highlophane Bags" Brochure, Highland Supply Corporation, 1990, 2 pages.
"Creative Packaging" Brochure, John Henry Company, Sep. 1992, 8 pages.
"Make Highlander Your Headquarters" Brochure, Highland Supply Corporation, 1991, 12 pages.
"Highlander Introduces the New Labor and Cost-Saving Monza™ Sheets for Plant Wrapping", Highland Supply Corporation, HSC 2003, 2 pages.

* cited by examiner

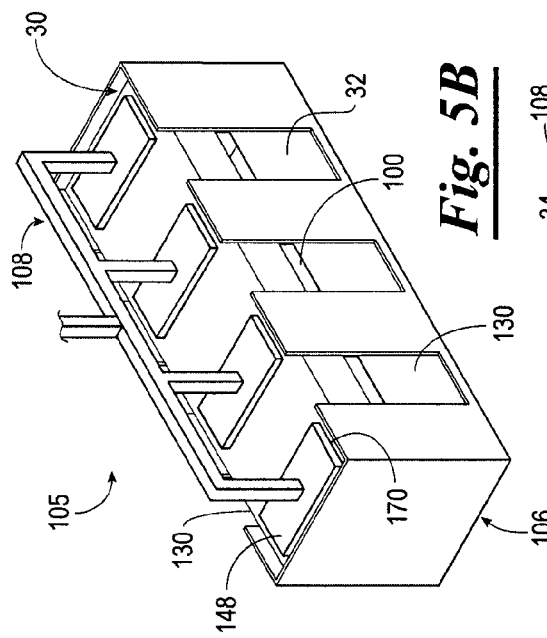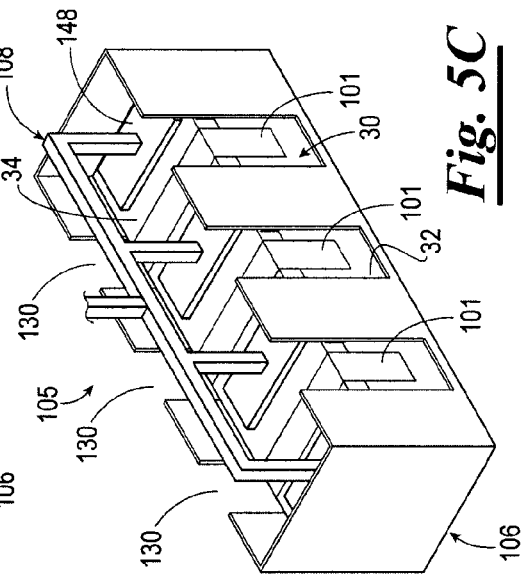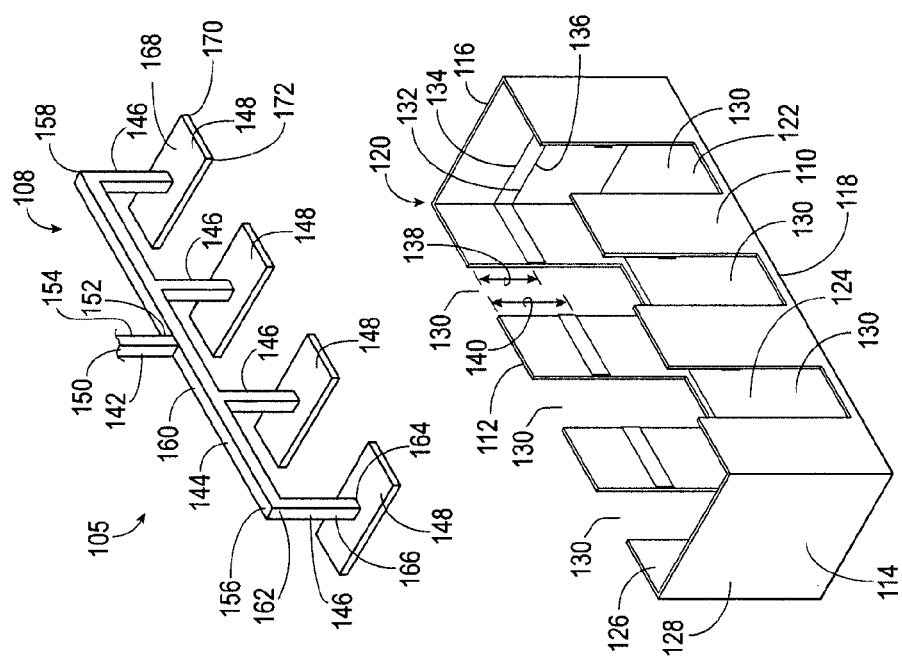

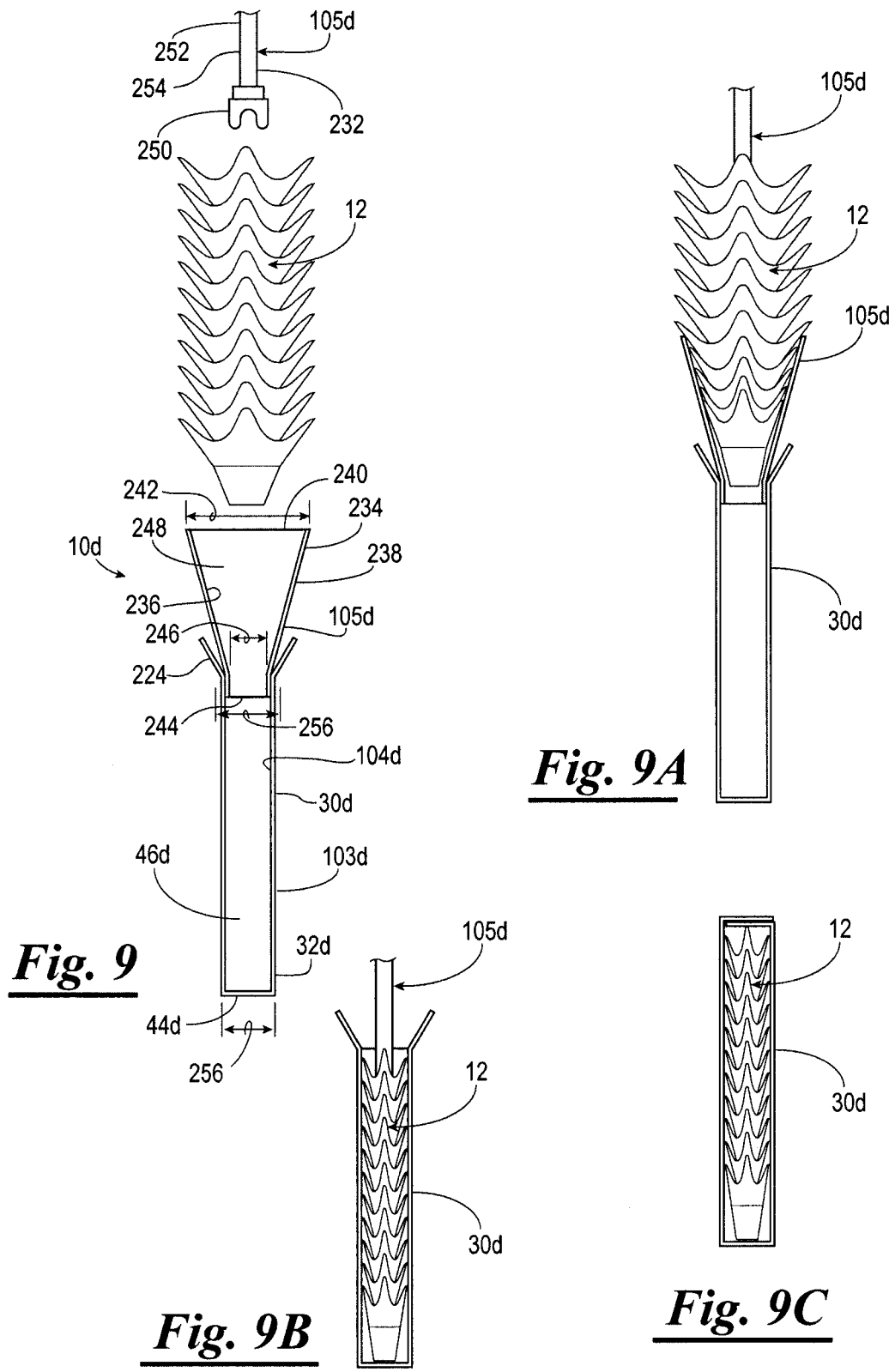

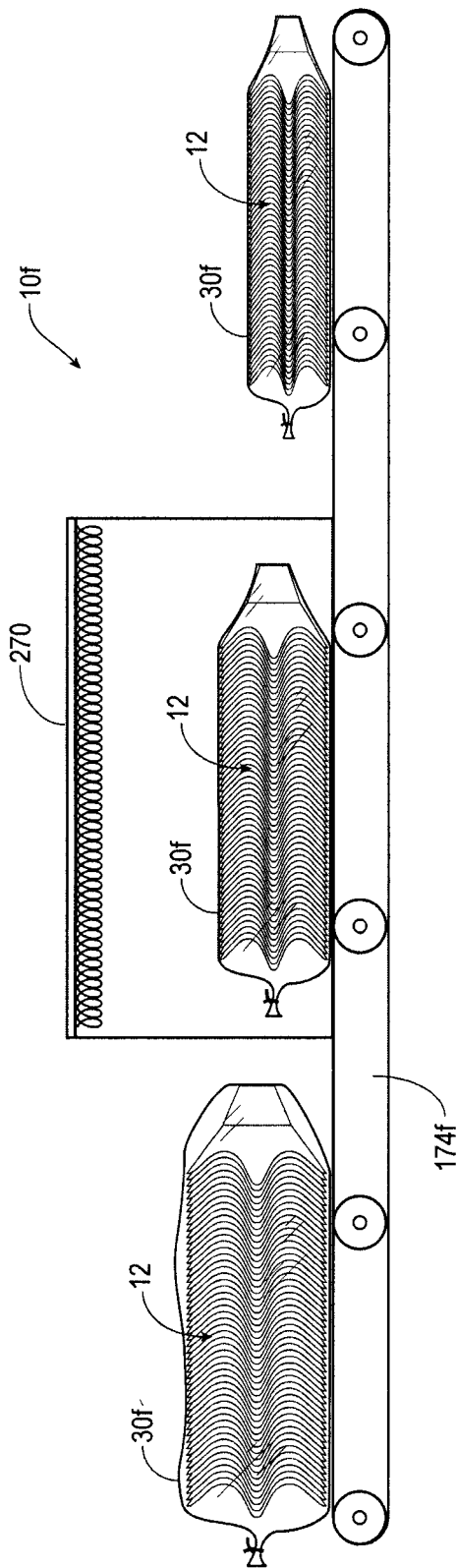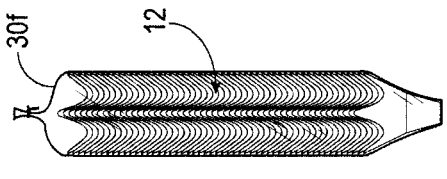

COMPRESSED PACKAGED ARTICLES AND METHODS OF MAKING, TRANSPORTING, SHIPPING AND USING SAME

CROSS-REFERENCE TO RELATED APPLICATIONS

This application is a continuation of U.S. Ser. No. 13/160,003, filed Jun. 14, 2011, now U.S. Pat. No. 8,171,670, issued May 8, 2012; which is a continuation of U.S. Ser. No. 12/378,564, filed Feb. 17, 2009, now U.S. Pat. No. 8,015,751, issued Sep. 13, 2011; which is a continuation of U.S. Ser. No. 11/100,205, filed Apr. 6, 2005, now abandoned; which claims priority under 35 U.S.C. 119(e) to provisional patent application U.S. Ser. No. 60/644,544, filed on Jan. 18, 2005. The entire contents of each of the above-referenced patents and patent applications are hereby expressly incorporated herein by reference.

STATEMENT REGARDING FEDERALLY SPONSORED RESEARCH OR DEVELOPMENT

Not Applicable.

BACKGROUND OF THE INVENTION

1. Field of the Invention

The present inventive concept(s) relates, in general, to articles that are packaged in a compressed state relative to an uncompressed fully articulated state and methods of making and using same. In a specific embodiment, but not to be considered as limiting, the articles so packaged in a compressed state are plant covers.

2. Background

Flower pot covers, including plant covers, and methods of making and using same are disclosed in U.S. Pat. No. 4,773,182, the entire contents of which are incorporated herein by reference in their entirety. In the U.S. Pat. No. 4,773,182 it is disclosed that the flower pot covers could be flattened and packaged for shipment and storing. The disclosed methods in the U.S. Pat. No. 4,773,182 required flattening each cover individually before packing and storing. The cost of packaging such flattened flower pot covers with each cover being separately flattened is greater than using a fully erected flower pot cover because substantial mechanical or manual labor is required to flatten, open and erect each cover separately.

In order to alleviate such deficiencies, the presently claimed and disclosed inventive concept(s) provides the packaging, storing and shipping of plant covers (more specifically, flower pot covers, floral grouping covers, sleeves, bags, and tubes) at higher density levels thereby providing for the efficient and economical packaging, storing and shipping of plant covers without substantially affecting the decorative properties of the plant covers. The presently claimed methods entail, in one embodiment, the placing of one plant cover inside of another plant cover (i.e., nesting the plant covers) so as to form a stack of two or more plant covers and thereafter compressing the entire stack of plant covers in either or both of the horizontal and vertical planes (i.e., along the height, length and/or width of the plant covers). Compressing the nested plant covers so as too partially or completely flatten the covers horizontally and/or vertically provides for a means of packing, storing and/or shipping plant covers in an efficient and economical manner.

By first nesting the plant covers and then compressing them, solely or primarily horizontally, the plant covers are made more easily useable than if the covers are individually flattened and then packed for shipping. The primary reason for this is that all of the covers can be re-erected to their full or semi-full three-dimensional shape with one motion of pressing horizontally on two opposing sides of the stack of nested covers so as to restore the covers to their fully erected form. This saves considerable time as opposed to erecting each individual cover, as is required if each cover has been individually flattened. Any remaining oval shape due to the plant covers being compressed are eliminated when the covers have been placed about a flower pot or placed about a floral grouping.

These and other methods and apparatuses are disclosed and claimed herein and will be apparent to one of ordinary skill in the art given the description, drawings and claims provided herein.

BRIEF DESCRIPTION OF THE SEVERAL VIEWS OF THE DRAWINGS

FIGS. 5A-5C are perspective views of one embodiment of the presently claimed and disclosed inventive concept(s).

FIGS. 9-9D are side views of an alternative embodiment of the presently claimed and disclosed inventive concept(s).

FIGS. 11-11C are side views of an alternative embodiment of the presently claimed and disclosed inventive concept(s).

DETAILED DESCRIPTION OF THE DRAWINGS

Figure 1A:
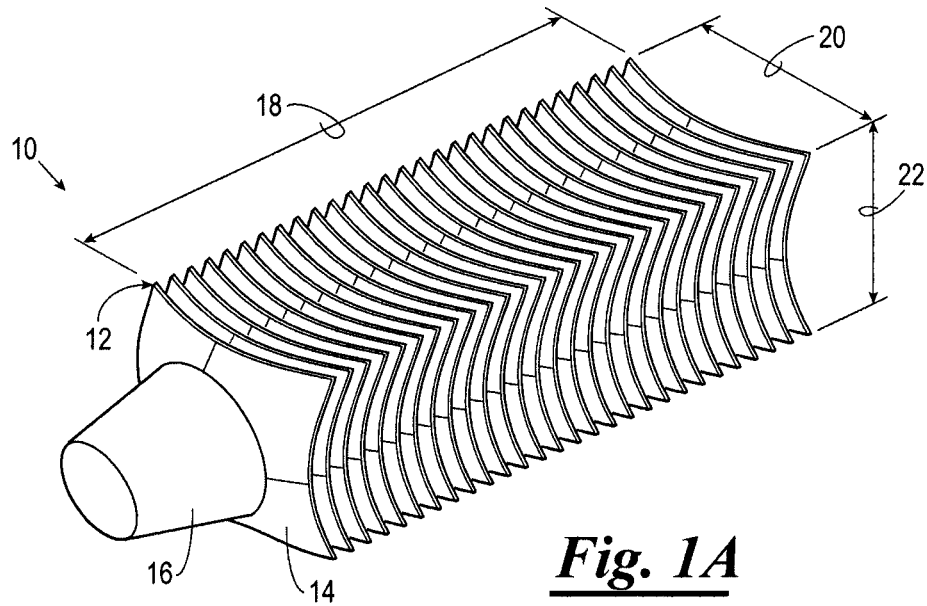
FIG. 1A is a perspective view of a plurality of nested plant covers.
Figure 1B:
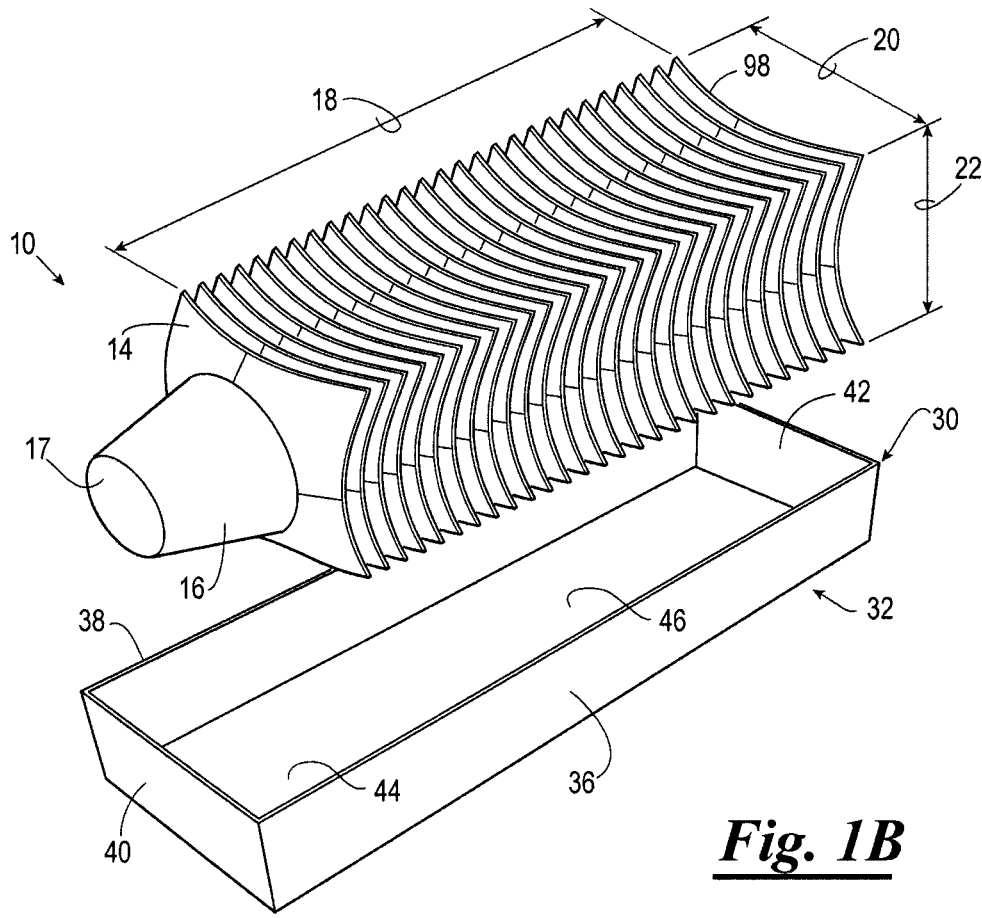
FIG. 1B is a perspective view of the plurality of nested plant covers of FIG. 1A adjacent a base member of one embodiment of the presently claimed and disclosed inventive concept(s).

Before explaining at least one embodiment of the inventive concept(s) in detail, it is to be understood that the inventive concept(s) is not limited in its application to the details of construction and the arrangement of the components set forth in the following description or illustrated in the drawings. The inventive concept(s) is capable of other embodiments or of being practiced or carried out in various ways and, as such, all such embodiments and/or equivalents are to be considered as being encompassed within the scope and description of the present inventive concept(s). Also, it is to be understood that the phraseology and terminology employed herein is for a purpose of description and should not be regarded as limiting.

The presently disclosed and claimed inventive concept(s) is drawn to a package containing a plurality of compressed articles, wherein the compressed articles are in a state substantially compressed from a fully articulated state. The package may further include a holding assembly having a retaining space, wherein the plurality of compressed articles is located within the retaining space. The package may also include means for securing the holding assembly in the state substantially compressed from a fully articulated state. The securing means may be selected from the group consisting of telescoping cartons, bags, shrink wrap, stretch wrap, bands, tape, adhesive, cohesives, staples, wire, ribbons, string, barbs and combinations thereof. The package may also include means for dispensing at least one of the compressed articles from the package containing the plurality of compressed articles.

The compressed articles in the state substantially compressed from the fully articulated state are compressed to a percentage of the fully articulated state selected from the group consisting of from about 5 to about 10 percent, from about 10 to about 15 percent, from about 15 to about 20 percent, from about 20 to about 25 percent, from about 25 to about 30 percent, from about 30 to about 35 percent, from about 35 to about 40 percent, from about 40 to about 45 percent, from about 45 to about 50 percent, from about 50 to about 55 percent, from about 55 to about 60 percent, from about 60 to about 65 percent, from about 65 to about 70 percent, from about 70 to about 75 percent, from about 75 to about 80 percent, from about 80 to about 85 percent, from about 85 to about 90 percent, from about 90 to about 95 percent and from about 95 to about 99 percent.

The compressed articles in the package may be nested or unnested and, in one embodiment, the compressed articles are plant covers.

In an alternative embodiment, the presently disclosed and claimed inventive concept(s) provides a method for packaging a plurality of nested plant covers utilizing the following steps: (a) providing a plurality of nested plant covers having a length and a width; (b) providing a holding assembly having a retaining space, the holding assembly having a compressed and an uncompressed condition; (c) placing the plurality of nested plant covers in the retaining space of the holding assembly; and (d) compressing the holding assembly from the uncompressed to the compressed condition such that the plurality of nested plant covers are compressed along at least one of the length and width of the plurality of nested plant covers thereby providing a package containing a plurality of compressed nested plant covers.

In this embodiment, the holding assembly is selected from the group consisting of bags, boxes, tubes, at least one sheet of material and combinations thereof. This method may further include the step of securing the holding assembly via a means for securing such that the plurality of nested plant covers is maintained in the compressed condition. The securing means may be selected from the group consisting of telescoping cartons, bags, shrink wrap, stretch wrap, bands, tape, adhesive, cohesives, staples, wires, ribbons, strings, barbs and combinations thereof. In this embodiment, the nested plant covers in the compressed condition are compressed to a percentage of the uncompressed condition selected from the group consisting of from about 5 to about 10 percent, from about 10 to about 15 percent, from about 15 to about 20 percent, from about 20 to about 25 percent, from about 25 to about 30 percent, from about 30 to about 35 percent, from about 35 to about 40 percent, from about 40 to about 45 percent, from about 45 to about 50 percent, from about 50 to about 55 percent, from about 55 to about 60 percent, from about 60 to about 65 percent, from about 65 to about 70 percent, from about 70 to about 75 percent, from about 75 to about 80 percent, from about 80 to about 85 percent, from about 85 to about 90 percent, from about 90 to about 95 percent and from about 95 to about 99 percent.

The method may also include the step of providing a means for dispensing at least one of the compressed nested plant covers from the package containing the plurality of compressed nested plant covers.

In an alternative embodiment, the presently disclosed and claimed inventive concept(s) provides a method for packaging a plurality of plant covers, comprising the steps of (a) providing a plurality of plant covers having a length and a width; (b) providing a holding assembly having a retaining space, the holding assembly having a compressed and an uncompressed condition; (c) placing the plurality of plant covers in the retaining space of the holding assembly; and (d) compressing the holding assembly from the uncompressed to the compressed condition such that the plurality of plant covers are compressed along at least one of the length and width of the plurality of plant covers thereby providing a package containing a plurality of compressed plant covers.

In this embodiment, the holding assembly is selected from the group consisting of bags, boxes, tubes, at least one sheet of material and combinations thereof. This method may further include the step of securing the holding assembly via a means for securing such that the plurality of nested plant covers is maintained in the compressed condition. The securing means may be selected from the group consisting of telescoping cartons, bags, shrink wrap, stretch wrap, bands, tape, adhesive, cohesives, staples, wires, ribbons, strings, barbs and combinations thereof. In this embodiment, the nested plant covers in the compressed condition are compressed to a percentage of the uncompressed condition selected from the group consisting of from about 5 to about 10 percent, from about 10 to about 15 percent, from about 15 to about 20 percent, from about 20 to about 25 percent, from about 25 to about 30 percent, from about 30 to about 35 percent, from about 35 to about 40 percent, from about 40 to about 45 percent, from about 45 to about 50 percent, from about 50 to about 55 percent, from about 55 to about 60 percent, from about 60 to about 65 percent, from about 65 to about 70 percent, from about 70 to about 75 percent, from about 75 to about 80 percent, from about 80 to about 85 percent, from about 85 to about 90 percent, from about 90 to about 95 percent and from about 95 to about 99 percent.

The method may also include the step of providing a means for dispensing at least one of the compressed nested plant covers from the package containing the plurality of compressed nested plant covers.

In an alternative embodiment, the presently disclosed and claimed inventive concept(s) provides a method for packaging a plurality of plant covers, comprising the steps of (a) providing a plurality of plant covers having a length and a width; (b) compressing the plurality of plant covers from an uncompressed condition to a compressed condition such that the plurality of plant covers are compressed along at least one of the length and width of the plurality of plant covers; (c) providing a holding assembly having a retaining space; and (d) placing the plurality of plant covers in the compressed condition in the retaining space of the holding assembly thereby providing a package containing a plurality of compressed plant covers.

In this embodiment, the holding assembly is selected from the group consisting of bags, boxes, tubes, at least one sheet of material and combinations thereof. This method may further include the step of securing the holding assembly via a means for securing such that the plurality of nested plant covers is maintained in the compressed condition. The securing means may be selected from the group consisting of telescoping cartons, bags, shrink wrap, stretch wrap, bands, tape, adhesive, cohesives, staples, wires, ribbons, strings, barbs and combinations thereof. In this embodiment, the nested plant covers in the compressed condition are compressed to a percentage of the uncompressed condition selected from the group consisting of from about 5 to about 10 percent, from about 10 to about 15 percent, from about 15 to about 20 percent, from about 20 to about 25 percent, from about 25 to about 30 percent, from about 30 to about 35 percent, from about 35 to about 40 percent, from about 40 to about 45 percent, from about 45 to about 50 percent, from about 50 to about 55 percent, from about 55 to about 60 percent, from about 60 to about 65 percent, from about 65 to about 70 percent, from about 70 to about 75 percent, from about 75 to about 80 percent, from about 80 to about 85 percent, from about 85 to about 90 percent, from about 90 to about 95 percent and from about 95 to about 99 percent.

The method may also include the step of providing a means for dispensing at least one of the compressed nested plant covers from the package containing the plurality of compressed nested plant covers.

In an alternative embodiment, the presently disclosed and claimed inventive concept(s) provides a method for packaging a plurality of plant covers, comprising the steps of (a) providing a plurality of nested plant covers having a length and a width; (b) compressing the plurality of nested plant covers from an uncompressed condition to a compressed condition such that the plurality of nested plant covers are compressed along at least one of the length and width of the plurality of nested plant covers; (c) providing a holding assembly having a retaining space; and (d) placing the plurality of nested plant covers in the compressed condition in the retaining space of the holding assembly thereby providing a package containing a plurality of compressed nested plant covers.

In this embodiment, the holding assembly is selected from the group consisting of bags, boxes, tubes, at least one sheet of material and combinations thereof. This method may further include the step of securing the holding assembly via a means for securing such that the plurality of nested plant covers is maintained in the compressed condition. The securing means may be selected from the group consisting of telescoping cartons, bags, shrink wrap, stretch wrap, bands, tape, adhesive, cohesives, staples, wires, ribbons, strings, barbs and combinations thereof. In this embodiment, the nested plant covers in the compressed condition are compressed to a percentage of the uncompressed condition selected from the group consisting of from about 5 to about 10 percent, from about 10 to about 15 percent, from about 15 to about 20 percent, from about 20 to about 25 percent, from about 25 to about 30 percent, from about 30 to about 35 percent, from about 35 to about 40 percent, from about 40 to about 45 percent, from about 45 to about 50 percent, from about 50 to about 55 percent, from about 55 to about 60 percent, from about 60 to about 65 percent, from about 65 to about 70 percent, from about 70 to about 75 percent, from about 75 to about 80 percent, from about 80 to about 85 percent, from about 85 to about 90 percent, from about 90 to about 95 percent and from about 95 to about 99 percent.

The method may also include the step of providing a means for dispensing at least one of the compressed nested plant covers from the package containing the plurality of compressed nested plant covers.

In an alternative embodiment, the presently disclosed and claimed inventive concept(s) provides a method for packaging a plurality of plant covers, comprising the steps of (a) providing a plurality of nested plant covers having a length and a width; (b) compressing the plurality of nested plant covers from an uncompressed condition to a compressed condition such that the plurality of nested plant covers are compressed along at least one of the length and width of the plurality of nested plant covers; (c) securing the nested plant covers in the compressed condition thereby providing a package containing a plurality of compressed nested plant covers.

In this embodiment, the holding assembly is selected from the group consisting of bags, boxes, tubes, at least one sheet of material and combinations thereof. This method may further include the step of securing the holding assembly via a means for securing such that the plurality of nested plant covers is maintained in the compressed condition. The securing means may be selected from the group consisting of telescoping cartons, bags, shrink wrap, stretch wrap, bands, tape, adhesive, cohesives, staples, wires, ribbons, strings, barbs and combinations thereof. In this embodiment, the nested plant covers in the compressed condition are compressed to a percentage of the uncompressed condition selected from the group consisting of from about 5 to about 10 percent, from about 10 to about 15 percent, from about 15 to about 20 percent, from about 20 to about 25 percent, from about 25 to about 30 percent, from about 30 to about 35 percent, from about 35 to about 40 percent, from about 40 to about 45 percent, from about 45 to about 50 percent, from about 50 to about 55 percent, from about 55 to about 60 percent, from about 60 to about 65 percent, from about 65 to about 70 percent, from about 70 to about 75 percent, from about 75 to about 80 percent, from about 80 to about 85 percent, from about 85 to about 90 percent, from about 90 to about 95 percent and from about 95 to about 99 percent.

The method may also include the step of providing a means for dispensing at least one of the compressed nested plant covers from the package containing the plurality of compressed nested plant covers.

In an alternative embodiment, the presently disclosed and claimed inventive concept(s) provides a method for packaging a plurality of nested plant covers comprising the steps of (a) providing a plurality of nested plant covers having a length and a width; (b) compressing the plurality of nested plant covers from an uncompressed condition to a compressed condition such that the plurality of nested plant covers are compressed along at least one of the length and width of the plurality of nested plant covers; (c) securing the nested plant covers in the compressed condition; (d) providing a holding assembly having a retaining space; and (e) placing the nested plant covers in the secured compressed condition in the retaining space of the holding assembly thereby providing a package containing a plurality of compressed nested plant covers. In this embodiment, the holding assembly is selected from the group consisting of bags, boxes, tubes, at least one sheet of material and combinations thereof.

This method may further include the step of securing the holding assembly via a means for securing such that the plurality of nested plant covers is maintained in the compressed condition. The securing means may be selected from the group consisting of telescoping cartons, bags, shrink wrap, stretch wrap, bands, tape, adhesive, cohesives, staples, wires, ribbons, strings, barbs and combinations thereof. In this embodiment, the nested plant covers in the compressed condition are compressed to a percentage of the uncompressed condition selected from the group consisting of from about 5 to about 10 percent, from about 10 to about 15 percent, from about 15 to about 20 percent, from about 20 to about 25 percent, from about 25 to about 30 percent, from about 30 to about 35 percent, from about 35 to about 40 percent, from about 40 to about 45 percent, from about 45 to about 50 percent, from about 50 to about 55 percent, from about 55 to about 60 percent, from about 60 to about 65 percent, from about 65 to about 70 percent, from about 70 to about 75 percent, from about 75 to about 80 percent, from about 80 to about 85 percent, from about 85 to about 90 percent, from about 90 to about 95 percent and from about 95 to about 99 percent.

The method may also include the step of providing a means for dispensing at least one of the compressed nested plant covers from the package containing the plurality of compressed nested plant covers.

In an alternative embodiment, the presently disclosed and claimed inventive concept(s) provides a method for packaging a plurality of nested plant covers, comprising the steps of (a) providing a plurality of nested plant covers having a length and a width; (b) providing a means for compressing and securing the plurality of nested plant covers, wherein the plurality of nested plant covers are compressed along at least one of the length and the width; and (c) compressing and securing the plurality of nested plant covers in a single step utilizing the compressing and securing means thereby providing a package containing a plurality of compressed nested plant covers.

This method may further include the step of securing the holding assembly via a means for securing such that the plurality of nested plant covers is maintained in the compressed condition. The securing means may be selected from the group consisting of telescoping cartons, bags, shrink wrap, stretch wrap, bands, tape, adhesive, cohesives, staples, wires, ribbons, strings, barbs and combinations thereof. In this embodiment, the nested plant covers in the compressed condition are compressed to a percentage of the uncompressed condition selected from the group consisting of from about 5 to about 10 percent, from about 10 to about 15 percent, from about 15 to about 20 percent, from about 20 to about 25 percent, from about 25 to about 30 percent, from about 30 to about 35 percent, from about 35 to about 40 percent, from about 40 to about 45 percent, from about 45 to about 50 percent, from about 50 to about 55 percent, from about 55 to about 60 percent, from about 60 to about 65 percent, from about 65 to about 70 percent, from about 70 to about 75 percent, from about 75 to about 80 percent, from about 80 to about 85 percent, from about 85 to about 90 percent, from about 90 to about 95 percent and from about 95 to about 99 percent.

The method may also include the step of providing a means for dispensing at least one of the compressed nested plant covers from the package containing the plurality of compressed nested plant covers.

In an alternative embodiment, the presently disclosed and claimed inventive concept(s) provides a method for packaging a plurality of nested plant covers, comprising the steps of (a) providing a plurality of nested plant covers having a length and a width; (b) providing a compressing assembly capable of compressing the plurality of nested plant covers along at least one of the length and the width; (c) placing the compressing assembly about the plurality of nested plant covers; (d) activating the compressing assembly such that the plurality of nested plant covers are compressed by the compressing assembly from an uncompressed condition to a compressed condition; and (e) securing the compressed plurality of nested plant covers in the compressed condition thereby providing a package containing a plurality of compressed nested plant covers.

This method may further include the step of securing the holding assembly via a means for securing such that the plurality of nested plant covers is maintained in the compressed condition. The securing means may be selected from the group consisting of telescoping cartons, bags, shrink wrap, stretch wrap, bands, tape, adhesive, cohesives, staples, wires, ribbons, strings, barbs and combinations thereof. In this embodiment, the nested plant covers in the compressed condition are compressed to a percentage of the uncompressed condition selected from the group consisting of from about 5 to about 10 percent, from about 10 to about 15 percent, from about 15 to about 20 percent, from about 20 to about 25 percent, from about 25 to about 30 percent, from about 30 to about 35 percent, from about 35 to about 40 percent, from about 40 to about 45 percent, from about 45 to about 50 percent, from about 50 to about 55 percent, from about 55 to about 60 percent, from about 60 to about 65 percent, from about 65 to about 70 percent, from about 70 to about 75 percent, from about 75 to about 80 percent, from about 80 to about 85 percent, from about 85 to about 90 percent, from about 90 to about 95 percent and from about 95 to about 99 percent.

The method may also include the step of providing a means for dispensing at least one of the compressed nested plant covers from the package containing the plurality of compressed nested plant covers.

In an alternative embodiment, the presently disclosed and claimed inventive concept(s) provides a method for packaging a plurality of nested plant covers, comprising the steps of (a) providing a plurality of nested plant covers having a length and a width; (b) providing a holding assembly, the holding assembly having a retaining space that has at least one of a length and a width that is less than the length and the width of the plurality nested plant covers; and (c) placing the plurality of nested plant covers into the retaining space of the holding assembly and thereby compressing the plurality of nested plant covers from an uncompressed condition to a compressed condition along at least one of the length and the width of the nested plant covers thereby providing a package containing a plurality of compressed nested plant covers.

This method may further include the step of securing the holding assembly via a means for securing such that the plurality of nested plant covers is maintained in the compressed condition. The securing means may be selected from the group consisting of telescoping cartons, bags, shrink wrap, stretch wrap, bands, tape, adhesive, cohesives, staples, wires, ribbons, strings, barbs and combinations thereof. In this embodiment, the nested plant covers in the compressed condition are compressed to a percentage of the uncompressed condition selected from the group consisting of from about 5 to about 10 percent, from about 10 to about 15 percent, from about 15 to about 20 percent, from about 20 to about 25 percent, from about 25 to about 30 percent, from about 30 to about 35 percent, from about 35 to about 40 percent, from about 40 to about 45 percent, from about 45 to about 50 percent, from about 50 to about 55 percent, from about 55 to about 60 percent, from about 60 to about 65 percent, from about 65 to about 70 percent, from about 70 to about 75 percent, from about 75 to about 80 percent, from about 80 to about 85 percent, from about 85 to about 90 percent, from about 90 to about 95 percent and from about 95 to about 99 percent.

The method may also include the step of providing a means for dispensing at least one of the compressed nested plant covers from the package containing the plurality of compressed nested plant covers.

In an alternative embodiment, the presently disclosed and claimed inventive concept(s) provides a method for transporting a plurality of nested plant covers, comprising the steps of (a) providing a holding assembly having an open configuration and a closed configuration, the holding assembly further having a retaining space; (b) providing a plurality of nested plant covers, wherein the plurality of nested plant covers have a length and a width; (c) placing the plurality of nested plant covers in the retaining space of the holding assembly; (d) compressing the holding assembly from the open configuration to the compressed configuration so as to compress the plurality of nested plant covers along at least one of the width and length of the plurality of nested plant covers; and (e) transporting the plurality of nested plant covers in the carton assembly to a predetermined location.

In an alternative embodiment, the presently disclosed and claimed inventive concept(s) provides a method for transporting a plurality of nested plant covers, comprising the steps of (a) providing a carton assembly capable of being reversibly articulated from an open configuration to a closed configuration, the carton assembly further having a base member and a lid member, the base member having an inner surface and an outer surface with the inner surface defining a retaining space; (b) providing a plurality of nested plant covers, wherein the plurality of nested plant covers have a width and a length; (c) placing the plurality of nested plant covers in the inner retaining space of the base member; (d) compressing the plurality of nested plant covers along at least one of the width and length of the plurality of nested plant covers; (e) matingly engaging the lid member with the base member so as to put the carton assembly in the closed configuration; and (f) transporting the plurality of nested plant covers in the carton assembly to a predetermined location.

In an alternative embodiment, the presently disclosed and claimed inventive concept(s) provides a plant cover transport assembly for transporting a plurality of nested plant covers from a first location to a second location, the plant cover transport assembly comprising (a) a base member and a lid member, the base member and the lid member being matingly engageable with one another, the base member further including an exterior surface and an interior surface wherein the interior surface defines an inner retaining space sized and shaped so as to be capable of receiving a plurality of nested plant covers having a width and a length and wherein the lid member is sized and shaped so as too substantially matingly engage the base member and compress the plurality of plant covers along at least one of the width and length of the plurality of nested plant covers when the transport assembly is in a closed configuration.

In an alternative embodiment, the presently disclosed and claimed inventive concept(s) provides a package containing a plurality of nested plant covers, the package comprising (a) a base member and a lid member; and (b) a plurality of nested plant covers having a width and a length. The base member may further include an exterior surface and an interior surface, the interior surface defining an inner retaining space sized and shaped so as to be capable of receiving the plurality of nested plant covers, the lid member sized and shaped so as to compress the plurality of plant covers in the inner retaining space along at least one of the width and length of the plurality of plant covers when the lid member matingly engages the base member thereby placing the package containing the plurality of nested plant covers in a closed configuration.

In an alternative embodiment, the presently disclosed and claimed inventive concept(s) provides a plant cover, comprising (a) a plant cover that substantially encompasses and surrounds a flower pot, wherein the plant cover has been transported from a first location to a second location utilizing a transport assembly. In this embodiment, the plant cover transport assembly further includes (a) a base member and a lid member, the base member and the lid member being matingly engageable with one another, the base member further including an exterior surface and an interior surface wherein the interior surface defines an inner retaining space sized and shaped so as to be capable of receiving a plurality of nested plant covers having a width and a length and wherein the lid member is sized and shaped so as too substantially matingly engage the base member and compress the plurality of plant covers along at least one of the width and length of the plurality of nested plant covers when the carton assembly is in a closed configuration.

In an alternative embodiment, the presently disclosed and claimed inventive concept(s) provides a method for storing a plurality of nested plant covers, comprising the steps of (a) providing a carton assembly capable of being reversibly articulated from an open configuration to a closed configuration, the carton assembly further having a base member and a lid member, the base member having an inner surface and an outer surface with the inner surface defining a retaining space; (b) providing a plurality of nested plant covers, wherein the plurality of nested plant covers have a width and a length; (c) placing the plurality of nested plant covers in the inner retaining space of the base member; (d) compressing the plurality of nested plant covers along at least one of the width and length of the plurality of nested plant covers; and (e) matingly engaging the lid member with the base member so as to put the carton assembly in the closed configuration to thereby provide a carton assembly having the plurality of nested plant covers stored therein.

In an alternative embodiment, the presently disclosed and claimed inventive concept(s) provides a method for transporting a plurality of plant covers, comprising the steps of (a) providing a carton assembly capable of being reversibly articulated from an open configuration to a closed configuration, the carton assembly further having a base member and a lid member, the base member having an inner surface and an outer surface with the inner surface defining a retaining space; (b) providing a plurality of plant covers, wherein the plurality of plant covers have a width and a length; (c) placing the plurality of plant covers in the inner retaining space of the base member; (d) compressing the plurality of plant covers along at least one of the width and length of the plurality of plant covers; (e) matingly engaging the lid member with the base member so as to put the carton assembly in the closed configuration; and (f) transporting the plurality of plant covers in the carton assembly to a predetermined location.

In an alternative embodiment, the presently disclosed and claimed inventive concept(s) provides a plant cover transport assembly for transporting a plurality of plant covers from a first location to a second location, the plant cover transport assembly includes a base member and a lid member, the base member and the lid member being matingly engageable with one another, the base member further including an exterior surface and an interior surface wherein the interior surface defines an inner retaining space sized and shaped so as to be capable of receiving a plurality of plant covers having a width and a length and wherein the lid member is sized and shaped so as too substantially matingly engage the base member and compress the plurality of plant covers along at least one of the width and length of the plurality of plant covers when the transport assembly is in a closed configuration.

In an alternative embodiment, the presently disclosed and claimed inventive concept(s) provides a package containing a plurality of plant covers; the package includes (a) a base member and a lid member; and (b) a plurality of plant covers having a width and a length. The base member further has an exterior surface and an interior surface, the interior surface defining an inner retaining space sized and shaped so as to be capable of receiving the plurality of plant covers, the lid member sized and shaped so as to compress the plurality of plant covers in the inner retaining space along at least one of the width and length of the plurality of plant covers when the lid member matingly engages the base member thereby placing the package containing the plurality of plant covers in a closed configuration.

In an alternative embodiment, the presently disclosed and claimed inventive concept(s) provides a plant cover, the plant cover substantially encompasses and surrounds a flower pot, wherein the plant cover has been transported from a first location to a second location utilizing a transport assembly. In this embodiment, the plant cover transport assembly further includes a base member and a lid member, the base member and the lid member being matingly engageable with one another, the base member further including an exterior surface and an interior surface wherein the interior surface defines an inner retaining space sized and shaped so as to be capable of receiving a plurality of plant covers having a width and a length and wherein the lid member is sized and shaped so as too substantially matingly engage the base member and compress the plurality of plant covers along at least one of the width and length of the plurality of plant covers when the carton assembly is in a closed configuration.

In an alternative embodiment, the presently disclosed and claimed inventive concept(s) provides a method for storing a plurality of plant covers, comprising the steps of (a) providing a carton assembly capable of being reversibly articulated from an open configuration to a closed configuration, the carton assembly further having a base member and a lid member, the base member having an inner surface and an outer surface with the inner surface defining a retaining space; (b) providing a plurality of nested plant covers, wherein the plurality of nested plant covers have a width and a length; (c) placing the plurality of nested plant covers in the inner retaining space of the base member; (d) compressing the plurality of nested plant covers along at least one of the width and length of the plurality of nested plant covers; and (e) matingly engaging the lid member with the base member so as to put the carton assembly in the closed configuration to thereby provide a carton assembly having the plurality of nested plant covers stored therein.

Turning now to the Figures, shown in FIGS. 1 through 5 is one embodiment of an article packaging assembly 10 which is constructed in accordance with the presently claimed and disclosed inventive concept(s). The article packaging assembly 10 is adapted to package, store and ship a plurality of articles (both nested and unnested articles, with an example of unnested articles shown more particularly in FIG. 4B) in a compressed condition or state. The term "compressed condition or state" is defined as a condition wherein the article occupies less space than the fully erected or uncompressed article. While the presently claimed and disclosed inventive concept(s) will be discussed primarily as being a packaging system, one of ordinary skill in the art will appreciate that the article packaging system 10 can also be used to store a plurality of articles in a compressed condition, to ship a plurality of articles in a compressed condition, or to package, ship, and/or store a plurality of articles in a compressed condition.

It should be noted that the presently claimed and disclosed article packaging system 10 is described herein as being capable of packaging, storing and shipping a plurality of nested and unnested articles with a plurality of nested plant covers 12 being shown for purposes of description in the Figures and should not be regarded as limiting. The presently claimed and disclosed inventive concept(s) should not be regarded as being limited to the plurality of nested plant covers 12 (a type of article that is extremely advantageous for use with the presently claimed and disclosed inventive concept(s)): rather, the term "article" is intended to cover any item that is capable of being placed into a compressed condition or state for packaging, storing or shipping. For example, but not by way of limitation, the articles may be drinking cups, flower pots, flower pot covers, flower pot sleeves, flower sleeves, vases, hats, saucers, Easter baskets, containers for use in microwave ovens (such as containers made from paper, plastic, synthetic or natural fibers), rose stem boxes, egg cartons, potting trays, pans, trays, bowls, basket liners, candy trays, candy cups, planter trays for growing plants, disposable bowls and dishes, silverware, corsage boxes and containers, food service trays (such as those used for bakery goods, French fries, ground beef, liver and other raw meats in supermarkets, for example), boxes for hamburgers or pies and the like, and various other articles. The term "article" as used herein is intended to encompass all of the specific articles just mentioned and the term article also is intended to be interpreted broadly enough to encompass any other article having a predetermined shape where the article may be compressed and uncompressed and still be capable of substantially maintaining its intended uncompressed function.

The article packaging system 10 is shown with the plurality of nested plant covers 12 in FIGS. 1-5 as shown in FIG. 1A, the plurality of nested plant covers 12 have a skirt portion 14, a base portion 16, a bottom 17, a length 18, a width 20 and a height 22. The base portion 16 further has an outer peripheral surface 24, an inner peripheral surface 26, and a holding space 28 defined by the inner peripheral surface 26 (see FIG. 4).

The article packaging system 10 (shown in FIGS. 1B, and 2-4) also includes a holding assembly 30. The holding assembly 30 has a base member 32 and a lid member 34. The base member 32 has a first side 36, a second side 38, a first edge 40, a second edge 42 and a bottom side 44, all of which cooperate to define and form a base member inner retaining space 46. The base member 32 and the base member inner retaining space 46 are shown generally in FIG. 1B as a carton or tray type of device. While this carton or tray type of device is one preferred embodiment of the base member 32, the presently claimed and disclosed inventive concept(s) should not be regarded as being limited to this embodiment: rather, all configurations of the base member 32 that meet the functional limitations and requirements herein set forth for the base member 32 are to be considered within the definition and description of the base member 32.

The lid member 34 of the holding assembly 30 has a first side 48, a second side 50, a first edge 52, a second edge 54 and a top side 56, all of which cooperate to define and form a lid member inner retaining space 58. The lid member 34 and the lid member inner retaining space 58 are shown generally in FIG. 1B as a carton or tray type of device. While this carton or tray type of device is one preferred embodiment of the lid member 34, the presently claimed and disclosed inventive concept(s) should not be regarded as being limited to this embodiment: rather, all configurations of the lid member 34 that meet the functional limitations and requirements herein set forth for the lid member 34 are to be considered within the definition and description of the base member 32.

Figure 2:
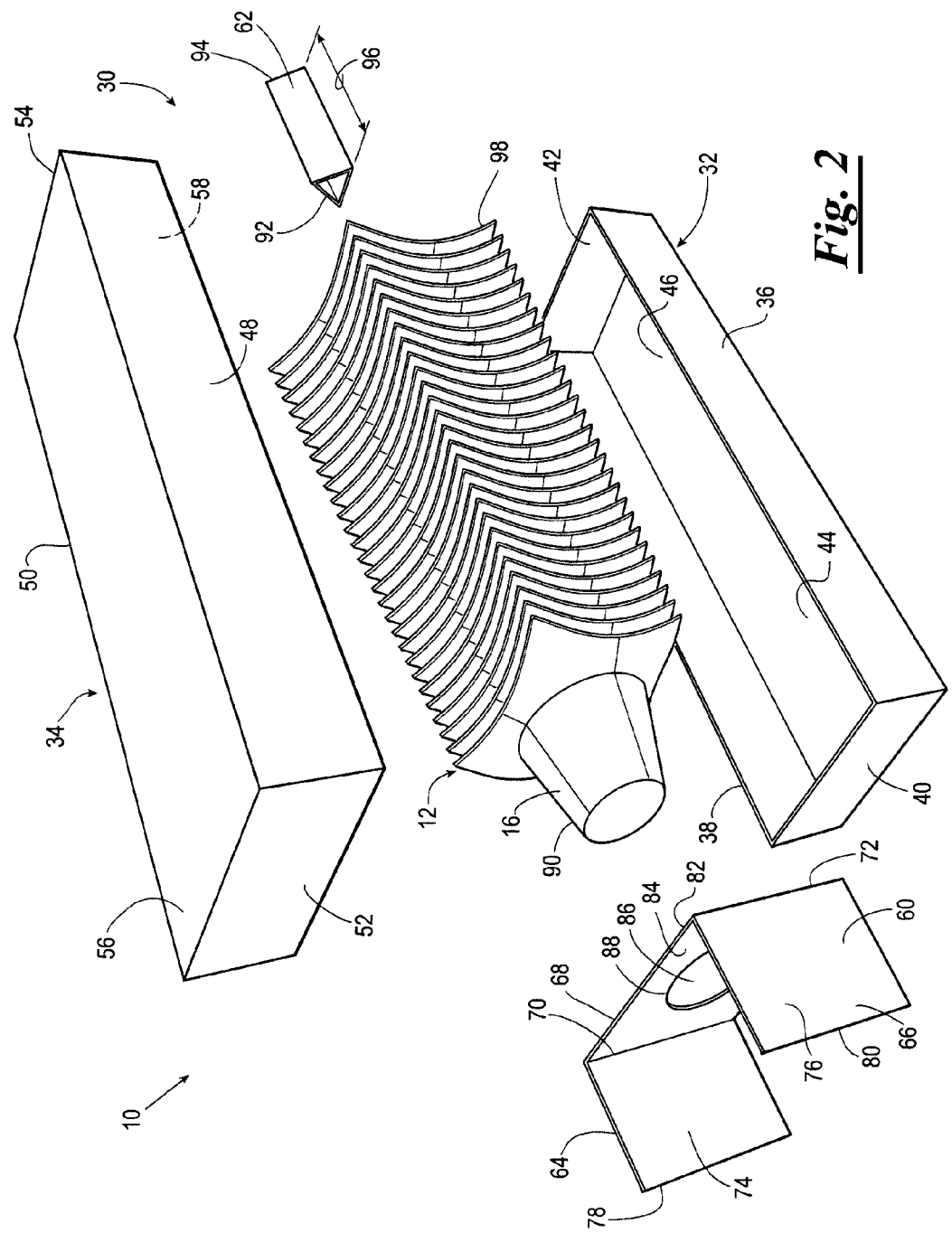
FIG. 2 is an exploded perspective view of one embodiment of the presently claimed and disclosed inventive concept(s).
Figure 3:
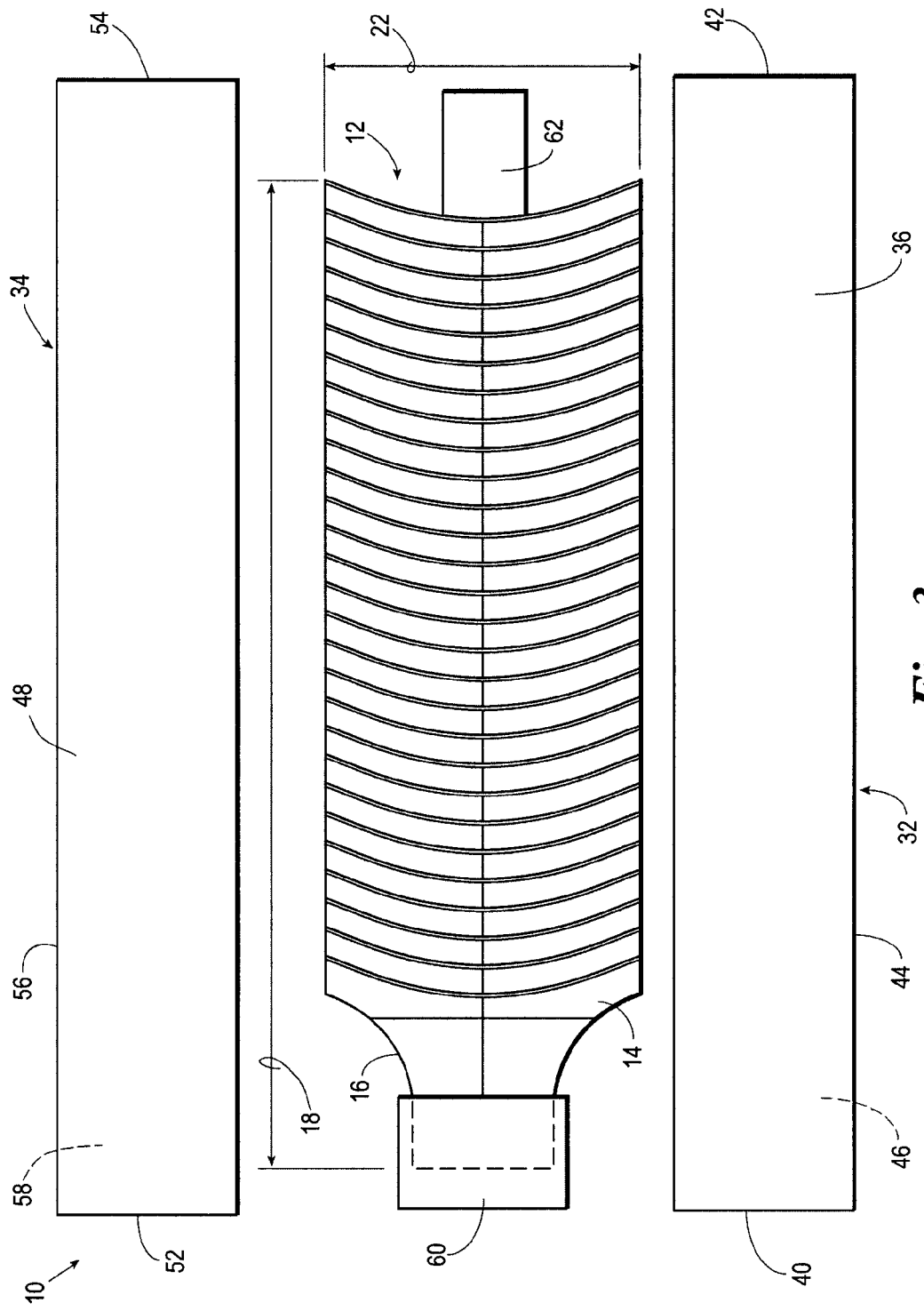
FIG. 3 is a side view of one embodiment of the presently claimed and disclosed inventive concept(s).
Figure 4:
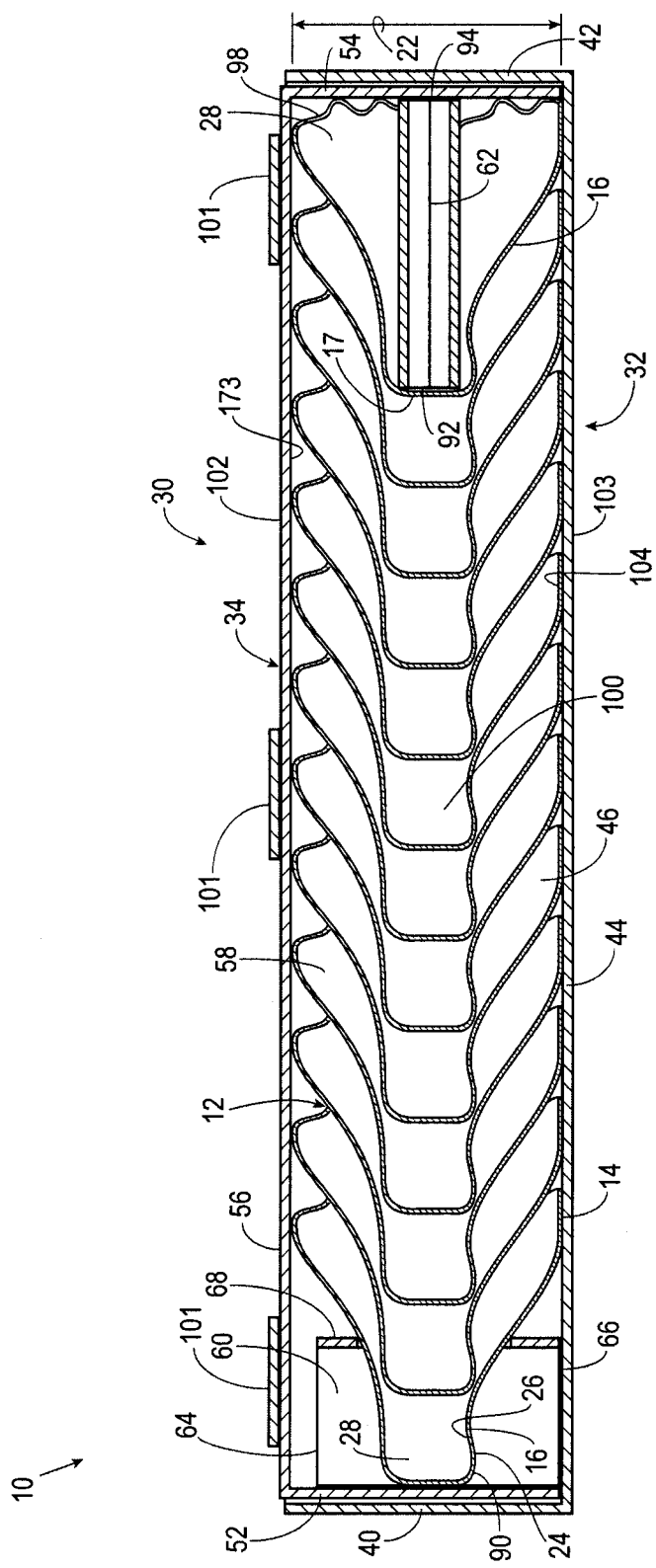
FIG. 4 is a further side view of one embodiment of the presently claimed and disclosed inventive concept(s) in operation.

Optionally and in a secondary embodiment, the holding assembly 30 may also include a base portion support member 60 and a holding space support member 62, both being shown in FIGS. 2-4. The base portion support member 60 is generally U-shaped and has a first flange 64, a second flange 66 and a platform 68 suspended between the first flange 64 and the second flange 66. Although the platform 68 is shown as being suspended from a first edge 70 of the first flange 64 and a first edge 72 of the second flange 66 in FIGS. 2-4, the presently claimed and disclosed inventive concept(s) should not be considered as being limited to such a configuration. Rather, the platform 68 may be suspended from a middle portion 74 of the first flange 64 and a middle portion 76 of the second flange 66. Alternatively, the platform 68 may be suspended from a second edge 78 of the first flange 64 and a second edge 80 of the second flange 66. Furthermore, the platform 68 may be suspended between any of the first edge 70, middle portion 74, second edge 78, first edge 72, middle portion 76, and second edge 80.

The platform 68 of the base portion support member 60 also has an upper surface 82, a lower surface 84 and a passageway 86 extending there through. The passageway 86 further includes a peripheral edge 88. The base portion support member 60 is fit around the base portion 16 of the plurality of nested plant covers 12 so as to hold and support the base portion 16 of a first plant cover 90 of the plurality of nested plant covers 12 when placed in the base member inner retaining space 46.

The holding space support member 62 has a first end 92, a second end 94 and a length 96 extending there between. The holding space support member 62 is placed into the holding space 28 of the base portion 16 of a last plant cover 98 of the plurality of nested plant covers 12 such that the first end 92 of the holding space support member 62 is adjacent the bottom 17 of the holding space 28 of the last plant cover 98 of the plurality of nested plant covers 12, and the second end 94 of the holding space support member 62 is adjacent the second edge 42 of the base member 32 with the length 96 of the holding space support member 62 extending there between. In this manner, the holding space support member 62 biases the plurality of nested plant covers 12 away from the second edge 42 of the base member 32 so as to keep the plurality of nested plant covers 12 in a substantially tightly nested condition or state.

As shown in FIG. 4, the holding assembly 30 forms an integrated structure when the base member 32 and the lid member 34 are matingly engaged with one another. In particular, the lid member 34 fits into the base member 32 wherein the lid member retaining space 58 and the base member inner retaining space 46 integrally mate to form a holding assembly inner retaining space 100. The holding assembly inner retaining space 100, when fully formed, is sized and shaped to be smaller than at least one of the length 18, width 20 and height 22 of the plurality of nested plant covers 12 so as to put the plurality of nested plant covers 12 in the compressed state or condition when the base member 32 and the lid member 34 are integrally mated to form the holding assembly inner retaining space 100.

After the base member 32 and the lid member 34 are integrally mated to form the holding assembly inner retaining space 100 (and thereby compressing the plurality of nested plant covers 12), at least one securing assembly 101 (with three securing assemblies 360 being shown in FIG. 4) can be placed onto the holding assembly 30 so as to hold the base member 32 and the lid member 34 in the integrally mated condition and thereby maintain the plurality of nested plant covers 12 in the compressed condition or state. One of ordinary skill in the art given the present specification would appreciate that the holding assembly 30 and the at least one securing assembly 101 may be a single unitary device. For example, but not by way of limitation, cling wrap may be used such that its inherent properties would fulfill the function or operation of both the holding assembly 30 and the at least one securing assembly 101 in a single unitary device. Of course, one of ordinary skill in the art given the present specification would recognize that many other devices other than the cling wrap could be used such as stretch wrap, barbs, staples, bands and so forth and these examples should not be regarded as limiting.

The at least one securing assembly 101 is shown in FIG. 4 as a band or segment of adhesive tape. The at least one securing assembly 101 is not to be considered as being limited to these embodiments, however, and the at least one securing assembly 101 may be a carton, a telescoping carton, tubes, bags, shrink wrap, stretch wrap, bands, tape, adhesive, cohesive, staples, wire, ribbons, string, twine, barbs, wireless staples, staples, cling wrap, interlocking members, tabs and mating members, ratcheting members, step lock members, bonding materials, chains, slats, strapping and combinations thereof. Also, although the at least one securing assembly 101 is shown in FIG. 4 as being placed on an outer surface 102 of the lid member 34 and extending around at least a portion of an outer surface 103 of the base member 32, one of ordinary skill in the art would also appreciate that the at least one securing assembly 101 may be alternatively placed on the outer surface 102 of the lid member 34 and thereafter engage an inner surface 104 of the base member 32 to hold the base member 32 and the lid member 34 in the integrally mated condition. Conversely, the at least one securing assembly 101 may be placed on the inner surface 104 of the base member 32 and thereafter engage the outer surface 102 of the lid member 34 to hold the base member 32 and the lid member 34 in the integrally mated condition.

Figure 4A:
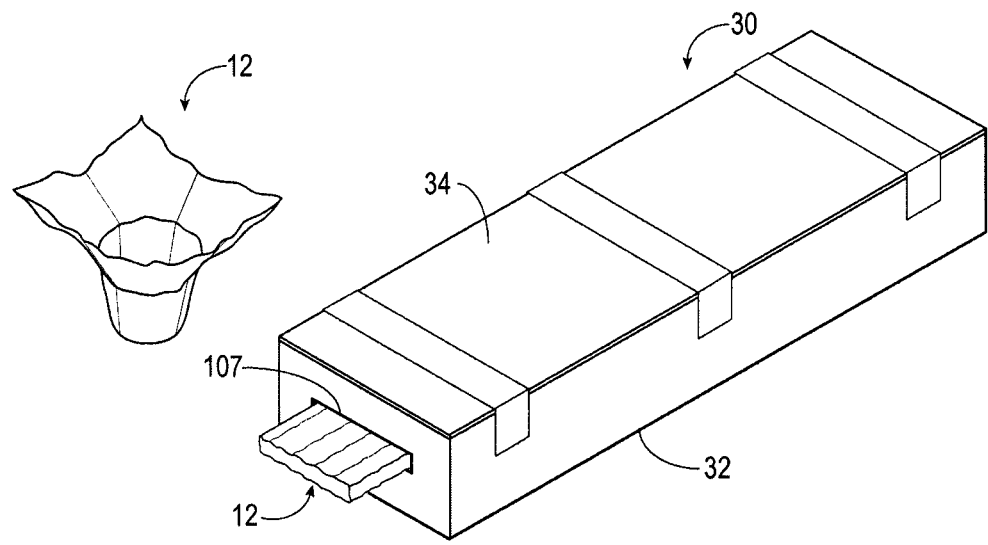
FIG. 4A is a perspective view of one embodiment of the presently claimed and disclosed inventive concept(s) in operation.
Figure 4B:
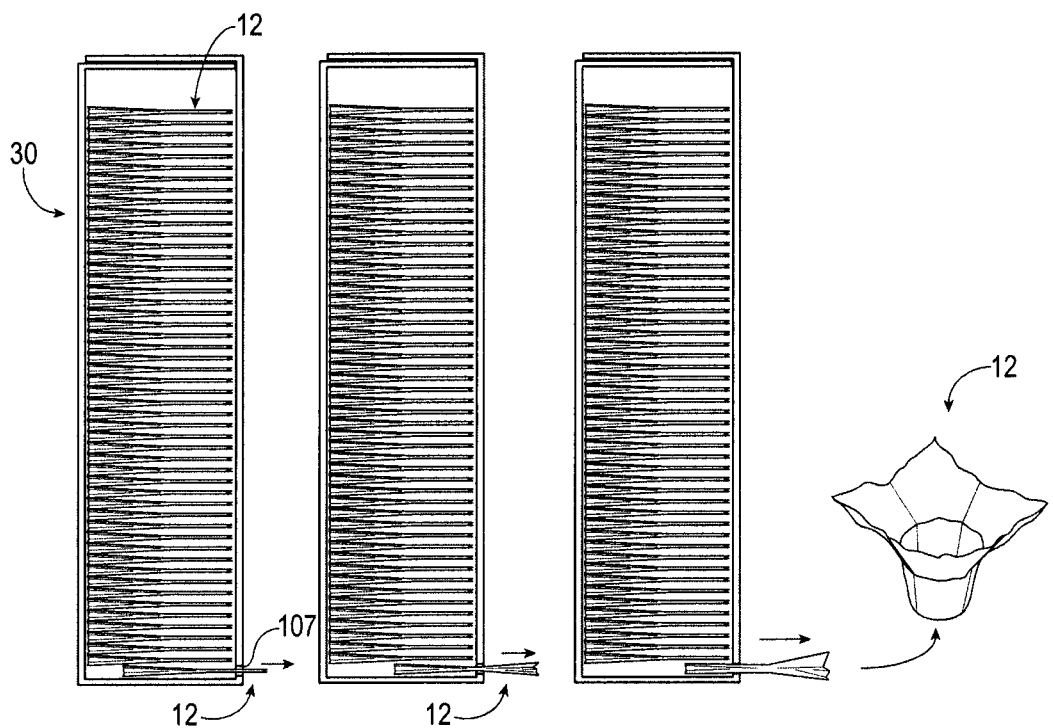
FIG. 4B is a side view of one embodiment of the presently claimed and disclosed inventive concept(s) in operation.

Optionally and in another embodiment, the holding assembly 30 may also include a dispensing means 107 for dispensing at least one of the plurality of nested plant covers 12 from the holding assembly inner retaining space 100 of the holding assembly 30, as shown for example in FIGS. 4A and 4B. Although the dispensing means 107 is shown as a rectangular cutout, the presently claimed and disclosed inventive concept(s) should not be considered as being limited to such a configuration.

Preferably, the dispensing means 107 is formed in at least one of the lid member 34 and the base member 32 of the holding assembly 30 prior to the lid member 34 and base member 32 being positioned in the integrally mated condition. However, one of ordinary skill in the art will appreciate that the dispensing means 107 can be formed in at least one of the lid member 34 and the base member 32 of the holding assembly 30 after the lid member 34 and base member 32 are positioned partially or completely in the integrally mated condition.

As shown in FIG. 4A, the dispensing means 107 can be utilized to dispense at least one of the plurality of plant covers 12 from the holding assembly 30 when the plurality of plant covers 12 are nested. Alternatively, as shown in FIG. 4B, the dispensing means 107 can be utilized to dispense at least one of the plurality of plant covers 12 from the holding assembly 30 when the plurality of plant covers 12 are unnested. In operation, once the at least one plant cover 12 is dispensed from the holding assembly 30 via the dispensing mans 107, the at least one plant cover 12 can be re-erected to its full or semi-full three-dimensional shape with one motion of pressing horizontally on two opposing sides of the at least one plant cover 12 so as to restore the at least one plant cover 12 to its fully erected form.

Shown in FIG. 5 is one embodiment of a compressing assembly 105 used to place the lid member 34 and the base member 32 in the integrally mated condition and thereby placing the plurality of nested plant covers 12 in the compressed condition or state. The compressing assembly 105 includes a containing member 106 and a compressing member 108.

The containing member 106 includes a first side 110, a second side 112, a first edge 114, a second edge 116, a bottom 118, a top portion 120 and a bottom portion 122, all of which cooperate to form a retaining space 124 having an inner peripheral surface 126 and an outer peripheral surface 128. At least one of the first side 110, the second side 112, the first edge 114 and the second edge 116 have at least one access point 130 (with six access points 130 being shown in FIGS. 5A-5C).

Although a biasing member 132 is shown in FIGS. 5A-5C, the biasing member 132 is an optional element and part of an alternate embodiment of the containing member 106 of the compressing assembly 105. The biasing member 132 has a top edge 134 and a bottom edge 136 and is generally triangularly shaped with the top edge 134 being generally narrower in a first depth 138 than a second depth 140 at the bottom edge 136 of the biasing member 132. The biasing member 132 acts to position the outer surface 102 of the first side 48, the second side 50, the first edge 52 and the second edge 54 of the lid member 34 into a configuration so as too easily fit adjacent the inner surface 104 of the first side 36, the second side 38, the first edge 40 and the second edge 42 of the base member 32.

As mentioned and shown in FIGS. 5A-5C, the compressing assembly 105 includes the compressing member 108. The compressing member 108 has a plunging member 142, a cross-member 144, a plurality of pressuring members 146 and a plurality of compression members 148. The plunging member 142 includes a first end 150, a second end 152 and a length 154 there between. The cross-member 144 includes a first end 156, a second end 158 and a length 160 there between. The plurality of pressuring members 146 includes a first end 162, a second end 164 and a length 166 there between. The plurality of compression members 148 includes an upper surface 168, a lower surface 170 and an outer peripheral edge 172. Although there, are shown four pressuring members 146 in FIGS. 5A-5C, any number of the pressuring members 146 may exist. Likewise, although there are shown four compression members 148 in FIGS. 5A-5C, any number of compression members 148 may exist. As will be appreciated by one of ordinary skill in the art, the number of pressuring members 146 and the number of compression members 148 may be widely varied and the inventive concept(s) should not be considered as being limited to any specific number and certainly should not be limited to the number shown in FIGS. 5A-5C.

In operation, the article packaging system 10 packages, stores and/or ships a plurality of articles such as the plurality of nested plant covers 12. One such use of the packaging system 10 is shown in FIGS. 1-5 with alternative embodiments shown in the remaining figures. The plurality of nested plant covers 12 are placed in the base member inner retaining space 46. In an alternate embodiment (shown in FIGS. 2-4), prior to the plurality of nested plant covers 12 being placed in the base member inner retaining space 46, the base portion support member 60 is placed on the base portion 16 of the first plant cover 90 of the plurality of nested plant covers 12 and the holding space support member 62 is placed within the holding space 28 of the last plant cover 98 of the plurality of nested plant covers 12. While the process is described as placing the plurality of nested plant covers 12 in the base member inner retaining space 46, it is also contemplated that the plurality of nested plant covers 12 could be initially placed within the lid member inner retaining space 58 as well.

Once the plurality of nested plant covers 12 are placed in the base member inner retaining space 46 of the base member 32, the lid member 34 is fitted within the base member 32 such that the outer surface 102 of the lid member 34 is adjacent the inner surface 104 of the base member 32. Alternatively and not shown, the lid member 34 may be fitted around the base member 32 such that an inner surface 173 of the lid member 34 is adjacent the outer surface 103 of the base member 32. In either embodiment, the base member 32 and the lid member 34 form a telescoping box-like configuration integrally mating to define and form the holding assembly inner retaining space 100.

After the mating of the base member 32 and the lid member 34 is accomplished thereby placing the plurality of nested plant covers 12 in the holding assembly inner retaining space 100, the bottom side 44 of the base member 32 and top side 56 of the lid member 34 are urged generally toward one another to thereby compress and place the plurality of nested plant covers 12 in a compressed state or condition. The term "compressed state or condition" means that the plurality of nested plant covers 12 have at least one of the length 18, the width 20 and the height 22 being less in the compressed state or condition than a similar plurality of nested plant covers that are in a fully uncompressed condition or state. The term "compressed state or condition" may also be conceptualized or described as the state or condition wherein the holding assembly inner retaining space 100 has a volume that is less than the volume of a plurality of nested plant covers in a fully erected and uncompressed condition or state.

It is contemplated that the plurality of nested plant covers 12 in the compressed condition or state are compressed to a percentage of the fully uncompressed condition from about 5 to about 10 percent, from about 10 to about 15 percent, from about 15 to about 20 percent, from about 20 to about 25 percent, from about 25 to about 30 percent, from about 30 to about 35 percent, from about 35 to about 40 percent, from about 40 to about 45 percent, from about 45 to about 50 percent, from about 50 to about 55 percent, from about 55 to about 60 percent, from about 60 to about 65 percent, from about 65 to about 70 percent, from about 70 to about 75 percent, from about 75 to about 80 percent, from about 80 to about 85 percent, from about 85 to about 90 percent, from about 90 to about 95 percent and from about 95 to about 99 percent. In a preferred embodiment, the plurality of nested plant covers 12 are compressed from about 40 to about 60 percent, an amount that allows for the compressed plurality of nested plant covers 12 to be rearticulated or uncompressed without substantially affecting the structure or appearance of the plurality of nested plant covers 12. In a further preferred embodiment, the plurality of nested plant covers 12 are compressed about 50 percent, an amount that allows for the compressed plurality of nested plant covers 12 to be rearticulated or uncompressed without substantially affecting the structure or appearance of the plurality of nested plant covers 12.

Once the plurality of nested plant covers 12 have been compressed within the holding assembly inner retaining space 100, the at least one securing assembly 101 is applied too at least a portion of the outer surface 102 of the lid member 34 and too at least a portion of the outer surface 103 of the base member 32 to maintain the holding assembly 30 in the compressed condition or state. It should also be apparent that the at least one securing assembly 101 may be placed on at least a portion of the outer surface 102 of the lid member 34 and too at least a portion of the outer surface 103 of the base member 32 prior to the step of compressing the holding assembly 30. In this embodiment, the at least one securing assembly 101 could be the means of compressing the holding assembly 30 or the at least one securing assembly 101 could be activated by the act of compressing the holding assembly 30 and thereafter maintain the holding assembly 30 in the compressed state or condition.

Any method by which the plurality of nested plant covers 12 can be compressed within the holding assembly 30 is contemplated as being within the scope of the presently claimed and disclosed inventive concept(s). While preferred embodiments of means in which to compress the holding assembly 30 are hereinafter set forth in detail, these preferred embodiments should not be regarded as limiting. Rather, these embodiments are set forth for the purpose of explaining one or more ways in which to compress the holding assembly 30 and thereby compress the plurality of nested plant covers 12 along at least one of the length 18, the width 20 and/or the height 22.

One such embodiment is shown in FIGS. 5A-5C. In this embodiment, the plurality of nested plant covers 12 is placed in the base member inner retaining space 46. The base member 32 containing the plurality of nested plant covers 12 is thereafter placed in the retaining space 124 of the containing member 106 of the compressing assembly 105. When placed in the retaining space 124, the outer surface 103 of the base member 32 is substantially adjacent the inner peripheral surface 126 of the containing member 106. The lid member 34 is then positioned over the retaining space 124 of the containing member 106 containing the base member 32. The lid member 34 is then moved downwardly (or the containing member 106 is moved upwardly) such that the outer surface 102 of the lid member 34 engages the biasing member 132 and thereafter the biasing member 132 urges at least one of the first side 48, the second side 50, the first edge 52 or the second edge 54 of the lid member 34 to fit within the base member 32 such that the outer surface 102 of the lid member 34 is substantially adjacent the inner surface 104 of the base member 32. In this manner the plurality of nested plant covers 12 are placed in the compressed condition or state within the holding assembly inner retaining space 100.

The act of moving the lid member 34 downwardly to engage with the base member 32 to compress the plurality of nested plant covers 12 within the holding assembly inner retaining space 100 can be accomplished in any number of ways. In the simplest embodiment, the lid member 34 is moved downwardly by hand to engage with the base member 32. Alternatively, any mechanical method may be used and the method may be fully automatic, partially automatic or manually actuated and used.

One such mechanical method is shown in FIGS. 5A-5C. In FIGS. 5B and 5C the compressing member 108 is shown as urging or moving the lid member 34 downwardly so as to engage the base member 32. In particular, the lower surface 170 of the plurality of compression members 148 are placed substantially adjacent to and in contact with the outer surface 102 of the lid member 34. The compressing member 108 is thereafter moved downwardly causing the lid member 34 to matingly engage the base member 32 and thereafter compress the plurality of nested plant covers 12 within the holding assembly inner retaining space 100. The compressing member 108 is shown in FIG. 5C as maintaining downward pressure on the outer surface 102 of the lid member 34 (thereby maintaining the plurality of plant covers 12 in the compressed state or condition) while at least one securing assembly 101 is placed adjacent at least a portion of at least one of the outer surface 102 of the lid member 34 and the outer surface 103 of the base member 32 so as to maintain and secure the plurality of nested plant covers 12 in the holding assembly inner retaining space 100 in the compressed condition or state.

The first end 150 of the plunging member 142 may be connected to any type of machinery (not shown) that is capable of moving the compressing member 108 vertically so as to be capable of reversibly applying pressure or compressive force on the holding assembly 30. Alternatively, the first end 150 of the plunging member 142 may be manually grasped (not shown) and moved in a vertical manner so as to be capable of reversibly applying pressure or compressive force on the holding assembly 30.

Once the at least one securing assembly 101 is placed about the holding assembly 30 to maintain the holding assembly 30 in the compressed condition or state, the compressing member 108 is removed and the holding assembly 30 containing the compressed plurality of nested plant covers 12 in the holding assembly inner retaining space 100 is removed from the containing member 106 of the compressing assembly 105 to provide a plurality of compressed plant covers (i.e., a compressed article) in a package that can be stored and shipped in an economical and efficient manner.

FIGS. 6A-6H show one embodiment of a semi-automated or fully automated method of compressing the plurality of nested plant covers 12 in the holding assembly 30. Shown in FIGS. 6A-6H is a compressing assembly 105a. The compressing assembly 105a includes a containing member 106a, a compressing member 108a, a conveyor assembly 174 and a securing member 176. The compressing member 108a includes a plunging member 142a, a cross member 144a and a plurality of compression members 148a. The plunging member 142a has a first end 150a, a second end 152a and a length 154a extending between the first end 150a and the second end 152a. The cross member 144a includes an upper surface 178, a lower surface 180 and an outer peripheral edge 182. The plurality of compression members 148a are shown in FIGS. 6A-6H as being integrally attached to the lower surface 180 of the cross member 144a. In the embodiment shown in FIGS. 6A-6H, the compression members 148a are rollers or any other device capable of moving independently of the cross member 144a and in a direction generally perpendicular to the movement of the cross member 144a and parallel to the movement of the holding assembly 30 through the compressing assembly 105a.

The containing member 106a is shown in FIGS. 6A-6H as being generally box-shaped although the containing member 106a can be of any shape and size as long as it maintains the function ascribed to the containing member 106a. Indeed, the containing member 106a is an optional element of the presently claimed and disclosed inventive concept(s) and one of ordinary skill in the art would appreciate that the containing member 106a is not essential to the operation of the compressing assembly 105a. When used and as shown in FIGS. 6A-6H, the containing member 106a includes an opening 184, an exit 186 and a passageway 188.

The conveyor assembly 174 includes a staging member 190 and a conveyor belt assembly 192. The securing member 176 includes an opening 194, an exit 196 and a passageway 198 extending between the opening 194 and the exit 196 of the securing member 176. The conveyor belt assembly 192 is positioned and extends under the containing member 106a and through the securing member 176. Alternatively (not shown), the conveyor belt assembly 192 may be positioned and extend through the containing member 106a as well as through the securing member 176.

In operation, the holding assembly 30 containing the plurality of nested plant covers 12 is placed on the staging member 190. Alternatively, the base member 32 may be placed on the staging member 190 and thereafter the plurality of nested plant covers 12 are placed within the base member inner retaining space 46 with the lid member 34 then being matingly engaged with the base member 32 as described herein above with respect to the embodiments of FIGS. 1-5. One of ordinary skill in the art will appreciate that the holding assembly 30 can be constructed prior to placing it on the staging member 190, that the holding assembly 30 can be partially constructed prior to placing it on the staging member 190 or that the holding assembly 30 can be fully constructed on the staging member 190. As can be appreciated from FIG. 6A, the base member 32 and the lid member 34 when placed on the staging member 190 may only be partially matingly engaged with one another—, i.e., the outer surface 102 of the lid member 34 may only be partially adjacent the inner surface 104 of the base member 32 such that the plurality of nested plant covers are not compressed or only partially compressed.

Figure 6A:
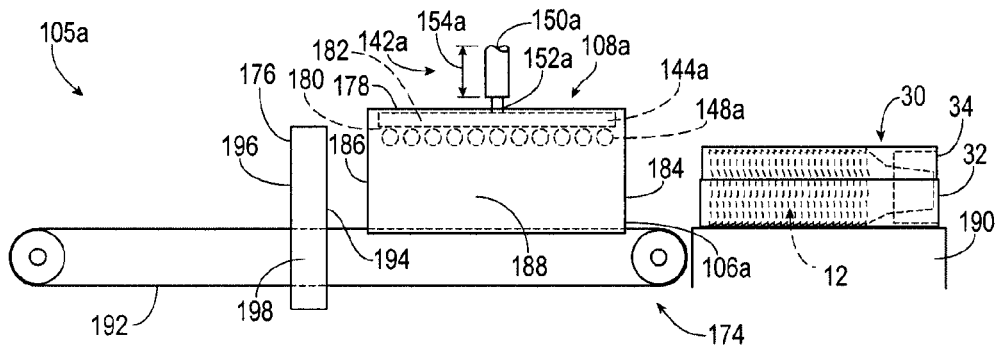
FIGS. 6A-6H are side views of an alternative embodiment of the presently claimed and disclosed inventive concept(s).
Figure 6B:
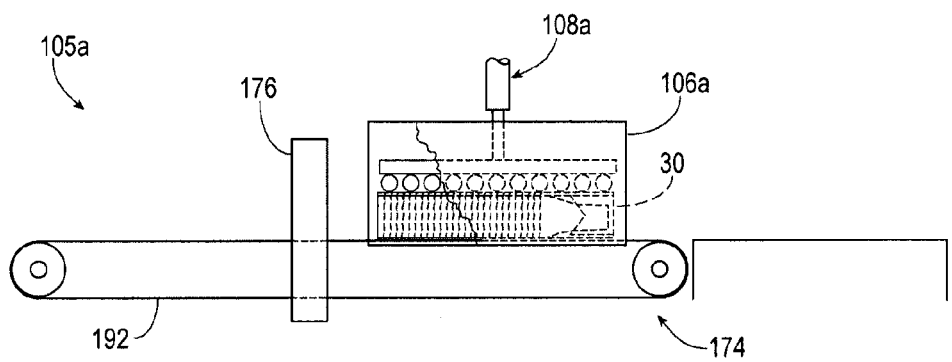

After the holding assembly 30 is placed on the staging member 190, it is moved onto the conveyor belt assembly 192 and into the passageway 188 of the containing member 106a as shown in FIG. 6B. After placing the holding assembly 30 into the passageway 188, the compressing member 108a is activated and moves downwardly such that the plurality of compression members 148a engage at least a portion of the outer surface 102 of the lid member 34 and urge or move the lid member 34 downwardly toward the base member 32 thereby compressing the holding assembly 30 and the plurality of nested plant covers 12 contained in the holding assembly inner retaining space 100. An alternate view of the containing member 106a, the holding assembly 30 and the compressing member 108a is shown in FIG. 6D and more clearly shows the compression of the holding assembly 30 and the plurality of nested plant covers 12 within the holding assembly inner retaining space 100.

Figure 6C:
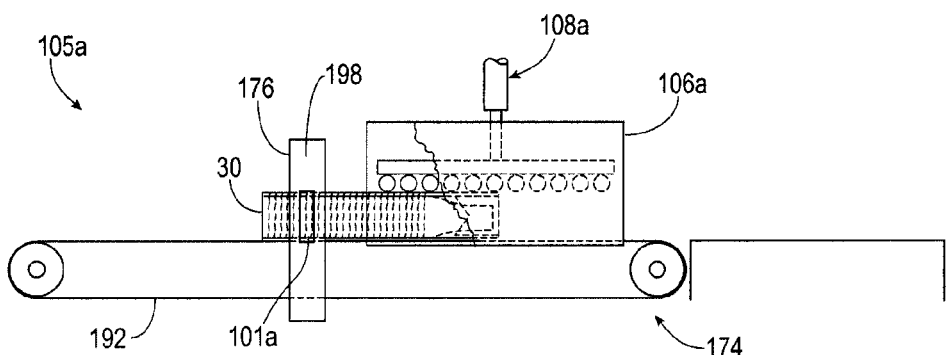
Figure 6D:
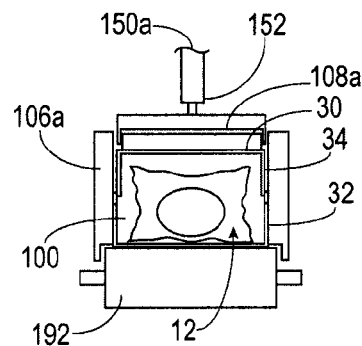
Figure 6E:
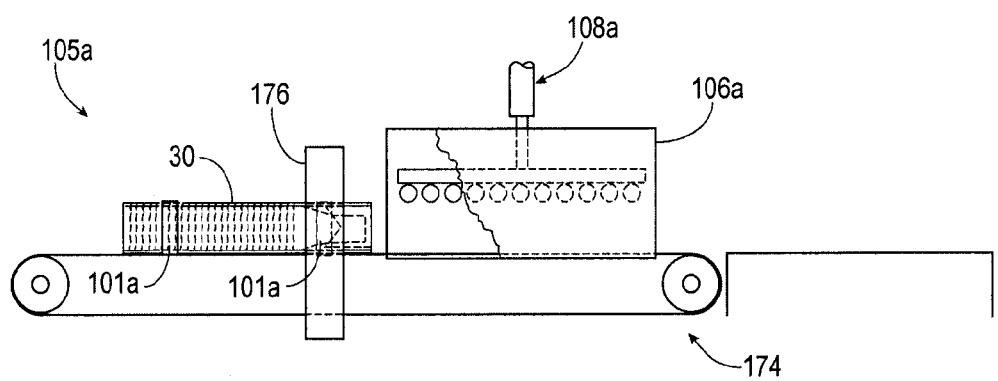
Figure 6F:
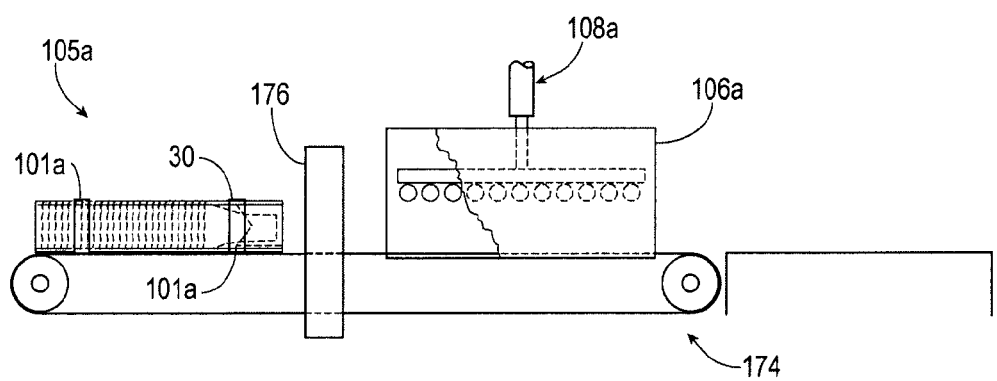
Figure 6G:
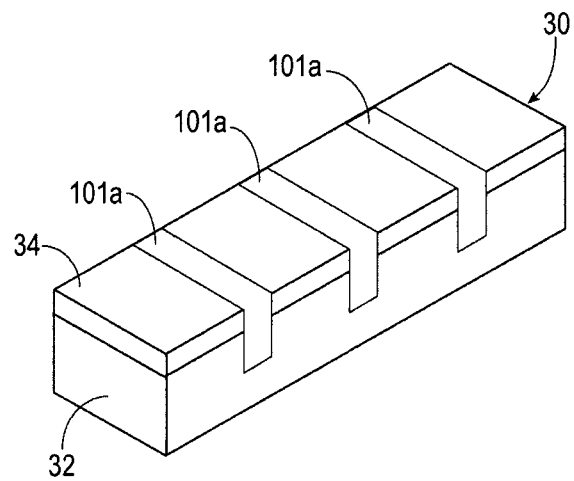

As shown in FIG. 6C, after the holding assembly 30 is compressed, the holding assembly 30 is moved along the conveyor belt assembly 192 out of the containing member 106a and through the passageway 198 of the securing member 176 wherein at least one securing assembly 101a is placed about the holding assembly 30. The at least one securing assembly 101a is the same as the at least one securing assembly 101 and performs the same function, i.e., to maintain the holding assembly 30 in the compressed state or condition after compression. As the holding assembly 30 moves through the securing member 176, additional securing assemblies 101a may be applied about the holding assembly 30 with three such securing assemblies 101a being shown applied to the holding assembly 30 in FIGS. 6E-6G.

Figure 6H:
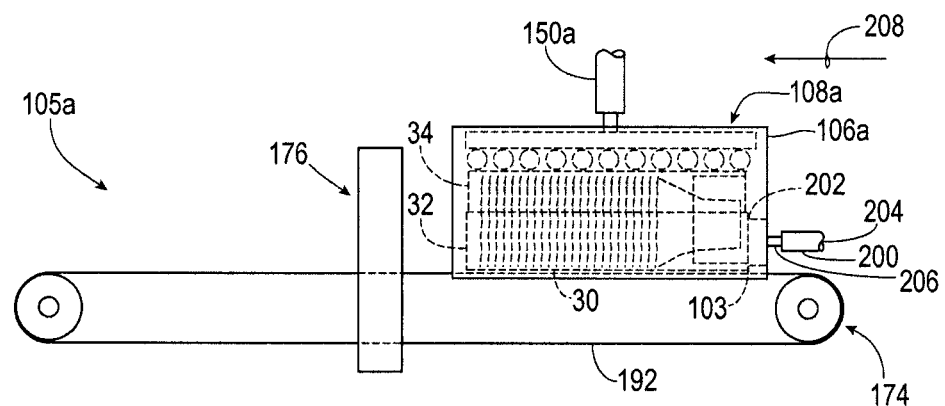

An alternate embodiment of the conveyor assembly 174 is shown in FIG. 6H as further including a secondary plunging member 200 which may be automatically, semi-automatically or manually actuated to assist in the movement of the holding assembly 30 through the containing member 106a. In operation, the secondary plunging member 200 has a first end 202, a second end 204 and a length 206 extending there between. The first end 202 of the secondary plunging member 200 is placed adjacent the outer surface 103 of the base member 32 and thereafter the secondary plunging member 200 is moved in a direction indicated by arrow 208 and generally toward the securing member 176. In this manner, the secondary plunging member 200 assists in moving the holding assembly 30 through the containing member 106a and the securing member 176.

Figure 7A:
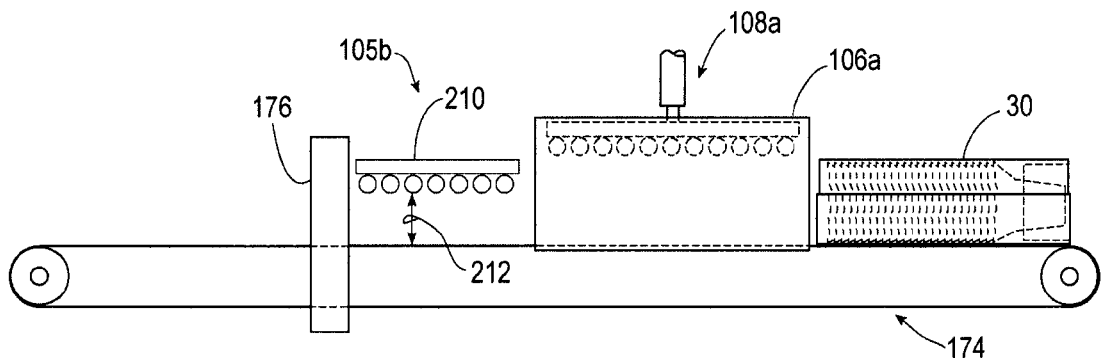
FIGS. 7A-7C are side views of an alternative embodiment of the presently claimed and disclosed inventive concept(s).
Figure 7B:
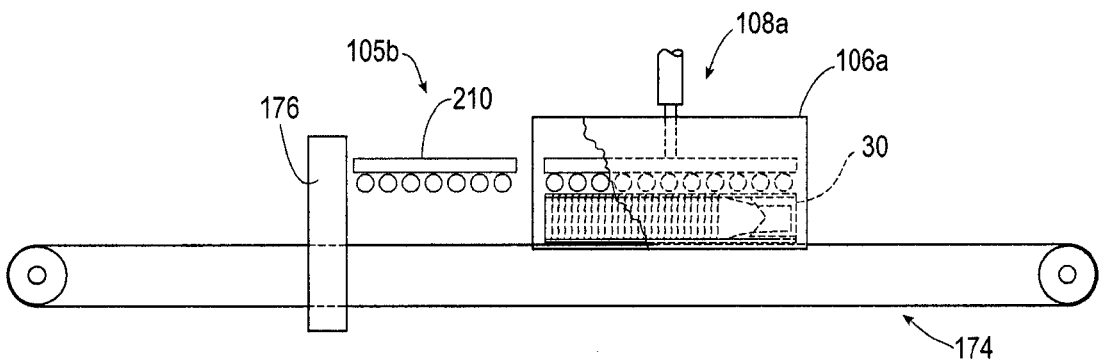
Figure 7C:
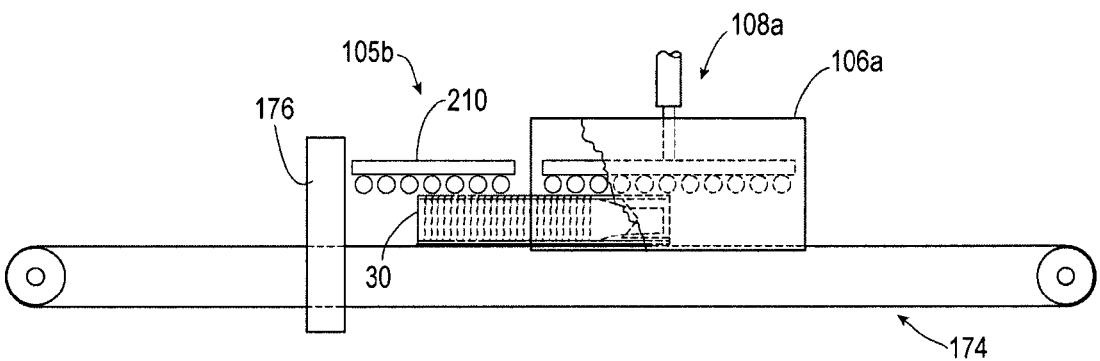

An alternate embodiment of the compressing assembly is shown in FIGS. 7A-7C and referenced generally as a compressing assembly 105b. The compressing assembly 105b is generally similar to the compressing assembly 105a described herein above except that an extension conveyor assembly 210 is further included. The extension conveyor assembly 210 is generally disposed a distance 212 above the conveyor assembly 174 and is placed in line between the containing member 106a and the securing member 176.

In operation, the holding assembly 30 is passed through the containing member 106a and compressed via the compressing member 108a (as shown in FIG. 7B) such that the holding assembly 30 fits between the extension conveyor assembly 210 and the conveyor assembly 174. In combination, the extension conveyor assembly 210 and the conveyor assembly 174 thereafter move the compressed holding assembly 30 into the securing member 176 wherein at least one securing assembly 101a is placed about the compressed holding assembly 30 to maintain the compressed holding assembly 30 and the plurality of nested plant covers 12 in the compressed condition or state.

Figure 8A:
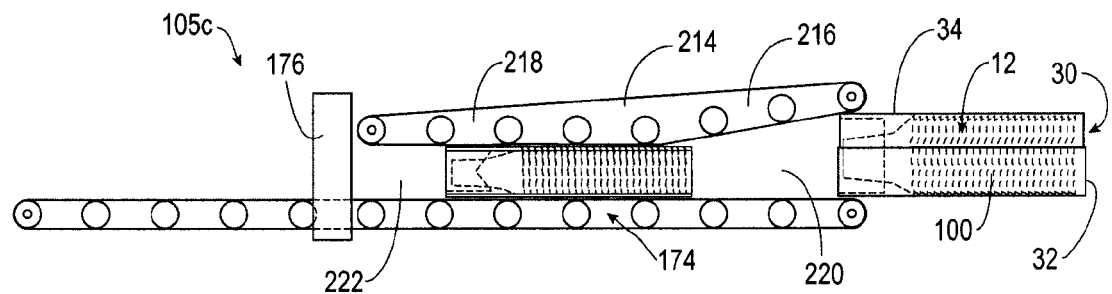
FIGS. 8A-8B are side views of an alternative embodiment of the presently claimed and disclosed inventive concept(s).
Figure 8B:
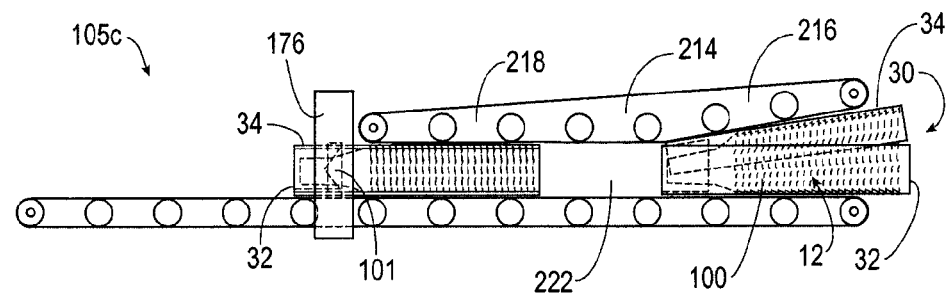

A further embodiment of the compressing assembly is shown in FIGS. 8A-8B and referenced generally as a compressing assembly 105c. The compressing assembly 105c includes the securing member 176 and the conveyor assembly 174. The compressing assembly 105c also includes a second conveyor assembly 214 having a tapered portion 216 and a horizontal portion 218. The second conveyor assembly 214 is disposed generally above the conveyor assembly 174. The tapered portion 216 of the second conveyor assembly 214 defines a tapered channel 220 disposed between the conveyor assembly 174 and the tapered portion 216 of the second conveyor assembly 214. The horizontal portion 218 of the second conveyor assembly 214 defines a horizontal channel 222 disposed between the conveyor assembly 174 and the horizontal portion 218 of the second conveyor assembly 214.

In operation, the holding assembly 30 having the plurality of plant covers 12 disposed therein is placed within the tapered channel 220 and moved into the horizontal channel 222 and generally toward the securing member 176. As the holding assembly 30 is moved through the tapered channel 220 and into the horizontal channel 222, the lid member 34 is moved generally downward so as too integrally mate with the base member 32 and thereby compress the plurality of nested plant covers 12 within the holding assembly inner retaining space 100. As the compressed holding assembly 30 leaves the horizontal channel 222, the compressed holding assembly 30 enters the securing member 176 wherein at least one securing assembly 101 is placed around the compressed holding assembly 30 so as to hold the compressed holding assembly 30 in the compressed condition and/or state.

Figure 9D:
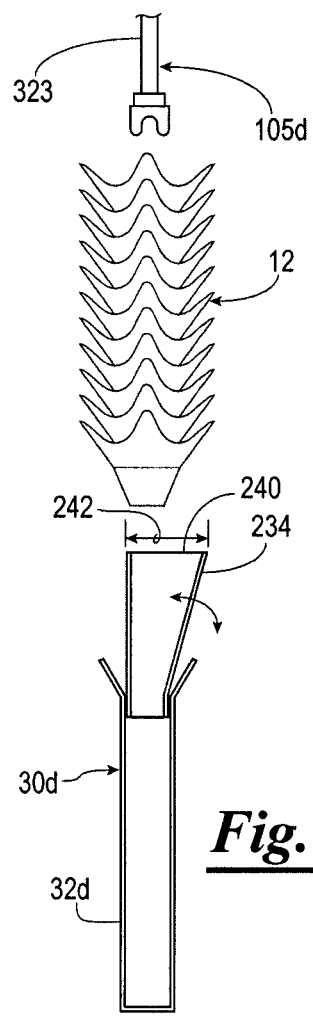

An alternative embodiment of the presently disclosed and claimed inventive concept(s) is shown in FIGS. 9-9D and designated as article packaging system 10d. Article packaging system 10d includes the plurality of nested plant covers 12, a holding assembly 30d and a compressing assembly 105d. The plurality of nested plant covers 12 used with the article packaging system 10d are identical to the plurality of nested plant covers previously described herein. As such, the description of the plurality of nested plant covers 12 will not be repeated here.

The holding assembly 30d is shown in FIGS. 9-9D as generally being a carton type of container having a base member 32d. The base member 32d has an inner surface 104d, an outer surface 103d, a bottom side 44d, a top side 224 and an inner retaining space 46d.

The compressing assembly 105d includes an urging member 232 and a biasing member 234. The biasing member 234 has an inner surface 236, an outer surface 238, a top side 240 having a width 242, a bottom side 244 having a width 246, and a passageway 248 defined by the inner surface 236 and extending from the top side 240 to the bottom side 244. As shown in FIGS. 9 and 9A, the width 242 of the top side 240 of the biasing member 234 is greater than the width 246 of the bottom side 244 of the biasing member 234. The urging member 232 has a first end 250, a second end 252 and a length 254 extending between the first end 250 and the second end 252.

In operation, the bottom side 244 of the biasing member 234 is placed adjacent and, in at least one embodiment, within the top side 224 of the base member 32d. In this embodiment, the width 246 of the bottom side 244 of the biasing member 234 is less than a width 256 of the inner retaining space 46d. The plurality of nested plant covers 12 are then placed adjacent the top side 240 of the biasing member 234. The first end 250 of the urging member 232 is then brought into contact with the plurality of nested plant covers 12 such that the plurality of nested plant covers 12 are urged into and through the passageway 248 of the biasing member 234 and into the inner retaining space 46d of the base member 32d. As the plurality of nested plant covers are urged through the passageway 248 of the biasing member 234, they are compressed along at least one of their length 18, width 20 or height 22. Once in the inner retaining space 46d of the base member 32d, the biasing member 234 is removed and the top side 224 of the base member 32d is closed or sealed to thereby provide a compressed and packaged system including the plurality of nested plant covers 12 shown in FIG. 9C. In an alternate embodiment shown in FIG. 9D, the width 242 of the top side 240 of the biasing member 234 may be adjustable so as to accommodate differing sizes of the plurality of nested plant covers 12 into the base member 32d. In the embodiment of FIG. 9D, the biasing member 234 has at least one hinge (not shown) that allows the width 242 of the top side 240 of the biasing member 234 to be varied.

Figure 10:
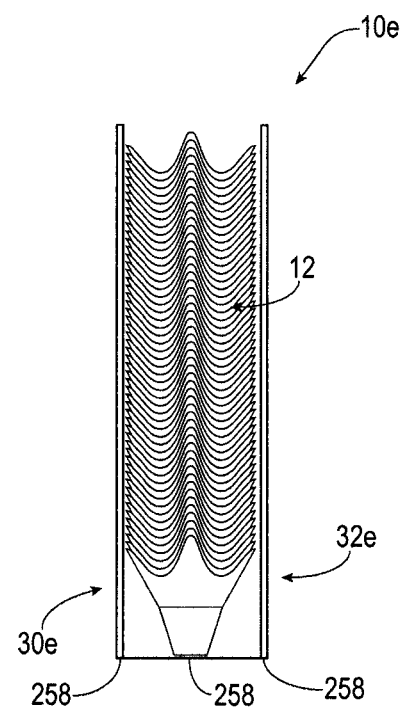
FIGS. 10-10B are side views of an alternative embodiment of the presently claimed and disclosed inventive concept(s).
Figure 10A:
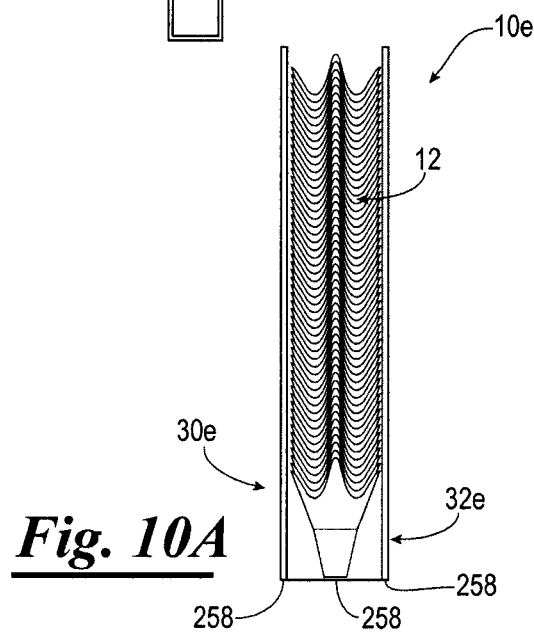
Figure 10B:
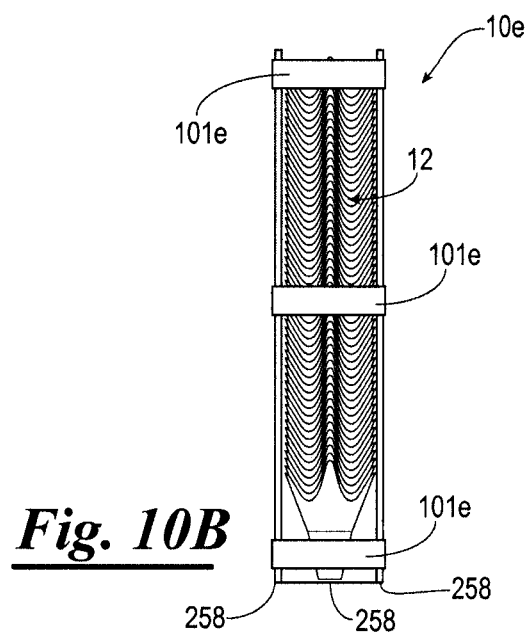

In yet another embodiment of the presently claimed and disclosed inventive concept(s), shown in FIGS. 10-10B is an article packaging system 10e which includes the plurality of nested plant covers 12, a holding assembly 30e having a base member 32e having a plurality of supports 258, and at least one securing assembly 101e. The plurality of nested plant covers 12 used with the article packaging system 10e is identical to the plurality of nested plant covers previously described herein. As such, the description of the plurality of nested plant covers 12 will not be repeated here.

In operation, the plurality of supports 258 are placed generally about the plurality of nested plant covers 12 with three such supports 258 being shown positioned about the plurality of nested plant covers 12 in FIGS. 10-10B. The plurality of nested plant covers 12 are then compressed along at least one of their width 20, height 22 and length 18 with the plurality of nested plant covers 12 being shown compressed along their width 20 in FIGS. 10-10B. After the plurality of nested plant covers 12 are compressed, at least one securing assembly 101e is placed around the plurality of nested plant covers 12 and the plurality of supports 258 such that the plurality of nested plant covers 12 are held in a compressed state. One of ordinary skill in the art would appreciate that the at least one securing assembly 101e could be applied around the plurality of nested plant covers 12 and the plurality of supports 258 either prior to or immediately after the plurality of nested plant covers 12 are compressed along at least one of their width, height and length.

Figures 11, 11A:
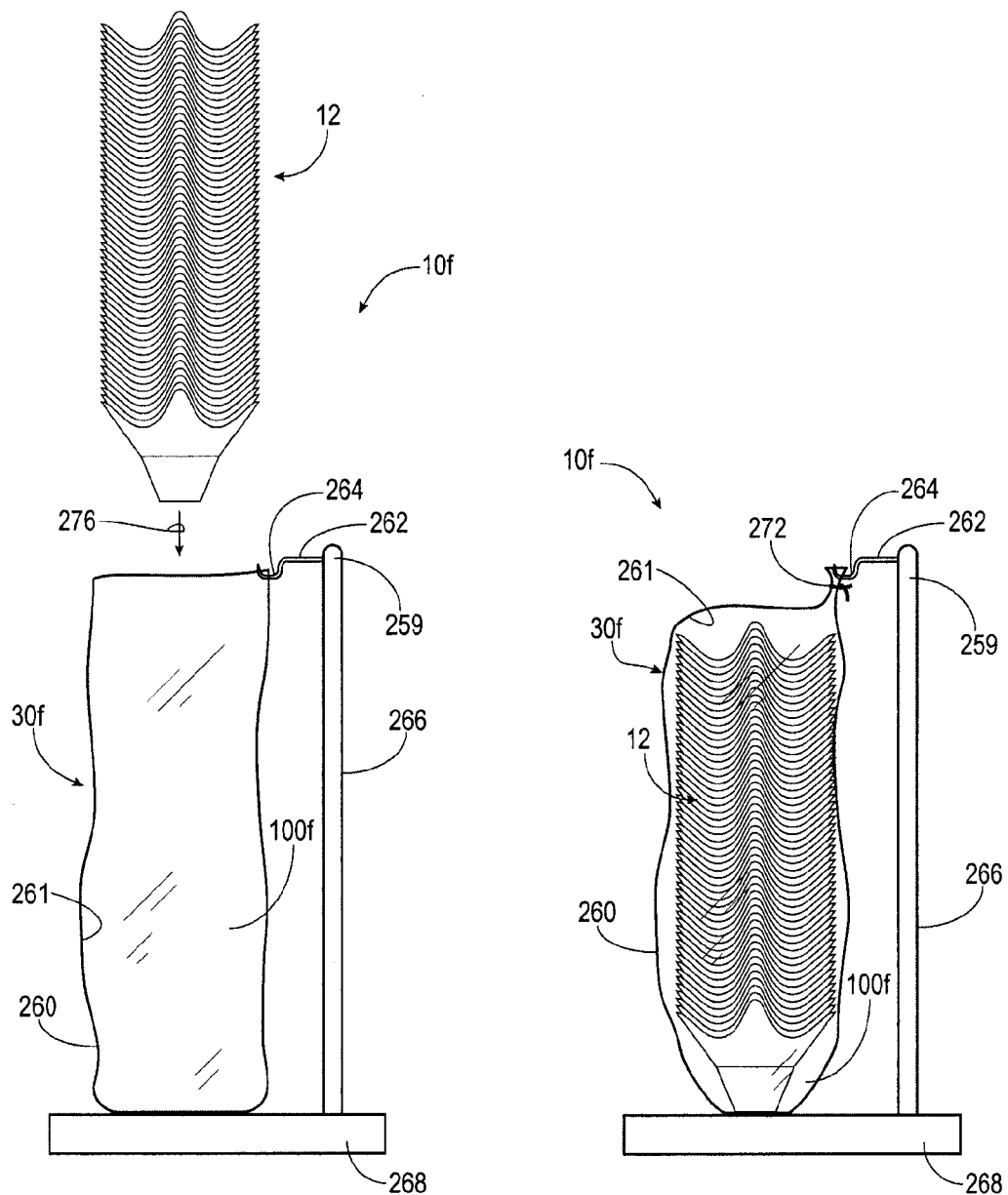

In an alternate embodiment of the presently disclosed and claimed inventive concept(s), shown in FIGS. 11-11C is an article packaging system 10f which includes the plurality of nested plant covers 12, a holding assembly 30f, a support assembly 259 and a conveyor assembly 174f. The holding assembly 30f includes an outer surface 260, an inner surface 261, and an inner retaining space 100f. The support assembly 259 includes an arm member 262 having a hanging assembly 264, an upright member 266 and a base 268. The conveyor assembly 174f includes an activation assembly 270.

As shown in FIGS. 11-11C, the holding assembly 30f is a bag-like device or member capable of receiving the plurality of nested plant covers 12 within the inner retaining space 100f. The holding assembly 30f may be constructed of any material capable of receiving the plurality of nested plant covers 12 and may be for example, but not be limited to, cellophane, plastic, paper, cloth, synthetic polymers, natural polymers, burlap and combinations thereof. In a preferred embodiment, the holding assembly 30f would comprise a shrink-wrap type of material such that the holding assembly 30f can be made to conform to the contours of the plurality of nested plant covers 12 disposed in the inner retaining space 100f of the holding assembly 30f.

As shown in FIG. 11A, the holding assembly 30f may also include a bonding assembly 272 that is capable of substantially closing and holding closed an upper end 274 of the holding assembly 30f. The bonding assembly, as used herein, is interchangeable with the term "bonding material." The term "bonding material" when used herein means an adhesive, frequently a pressure sensitive adhesive, or a cohesive. When the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer or hot melt material which may be applied to the material and, in this instance, heat, sound waves, or vibrations, also must be applied to effect the sealing.

The term "bonding material" when used herein also means any type of material or thing which can be used to effect the bonding or connecting of the two adjacent portions of the material or sheet of material to effect the connection or bonding described herein. The term "bonding material" may also include ties, labels, bands, ribbons, strings, tapes (including single or double-sided adhesive tapes), staples or combinations thereof. Some of the bonding materials would secure the ends of the material while other bonding material may bind the circumference of a wrapper, or a sleeve, or, alternatively and/or in addition, the bonding materials would secure overlapping folds in the material and/or sleeve. Another way to secure the wrapping and/or sleeve is to heat seal the ends of the material to another portion of the material. One way to do this is to contact the ends with an iron of sufficient heat to heat seal the material.

Alternatively, a cold seal adhesive may be utilized as the bonding material. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

The term "bonding material" when used herein also means any heat or chemically shrinkable material, and static electrical or other electrical materials, chemical welding materials, magnetic materials, mechanical or barb-type fastening materials or clamps, curl-type characteristics of the film or materials incorporated in material which can cause the material to take on certain shapes, cling films, slots, grooves, shrinkable materials and bands, curl materials, springs, and any type of welding method which may weld portions of the material to itself or to the plurality of nested plant covers 12, or to both the material itself and the plurality of nested plant covers 12.

In operation, the plurality of nested plant covers 12 are placed in the inner retaining space 100f of the holding assembly 30f in a direction indicated generally by arrow 276. Once the plurality of nested plant covers 12 are placed in the inner retaining space 100f, the upper end 274 of the holding assembly 30f is substantially closed by the bonding assembly 272. Thereafter, the holding assembly 30f is removed from the support assembly 259 and placed on the conveyor assembly 174f. The conveyor assembly 174f enters and extends through the activation assembly 270 such that the holding assembly 30f is moved into and through the activation assembly 270. Once in the activation assembly 270, the holding assembly 30f is shrunk so as too substantially conform to the size and shape of the plurality of nested plant covers 12. The activation assembly 270 may be an oven wherein the heat generated by the activation assembly 270 causes the holding assembly 30f to shrink. Alternatively, the activation assembly 270 may be a device capable of generating microwaves which cause the holding assembly 30f to shrink and substantially conform to the size and shape of the plurality of nested plant covers 12. One of ordinary skill in the art would appreciate that the activation assembly 270 may be any device capable of causing the holding assembly 30f to contract and/or shrink so as too substantially conform to the size and shape of the plurality of nested plant covers 12. In a more preferred embodiment, the activation assembly 270 would cause the holding assembly 30f to shrink or compress to such an extent that the plurality of nested plant covers 12 would be reduced in overall area such that the compressed plurality of nested plant covers 12 take up less space than an uncompressed and plurality of nested flower pot covers. Such a compressed plurality of nested plant covers 12 are shown in FIG. 11C.

Figures 12A, 12B:
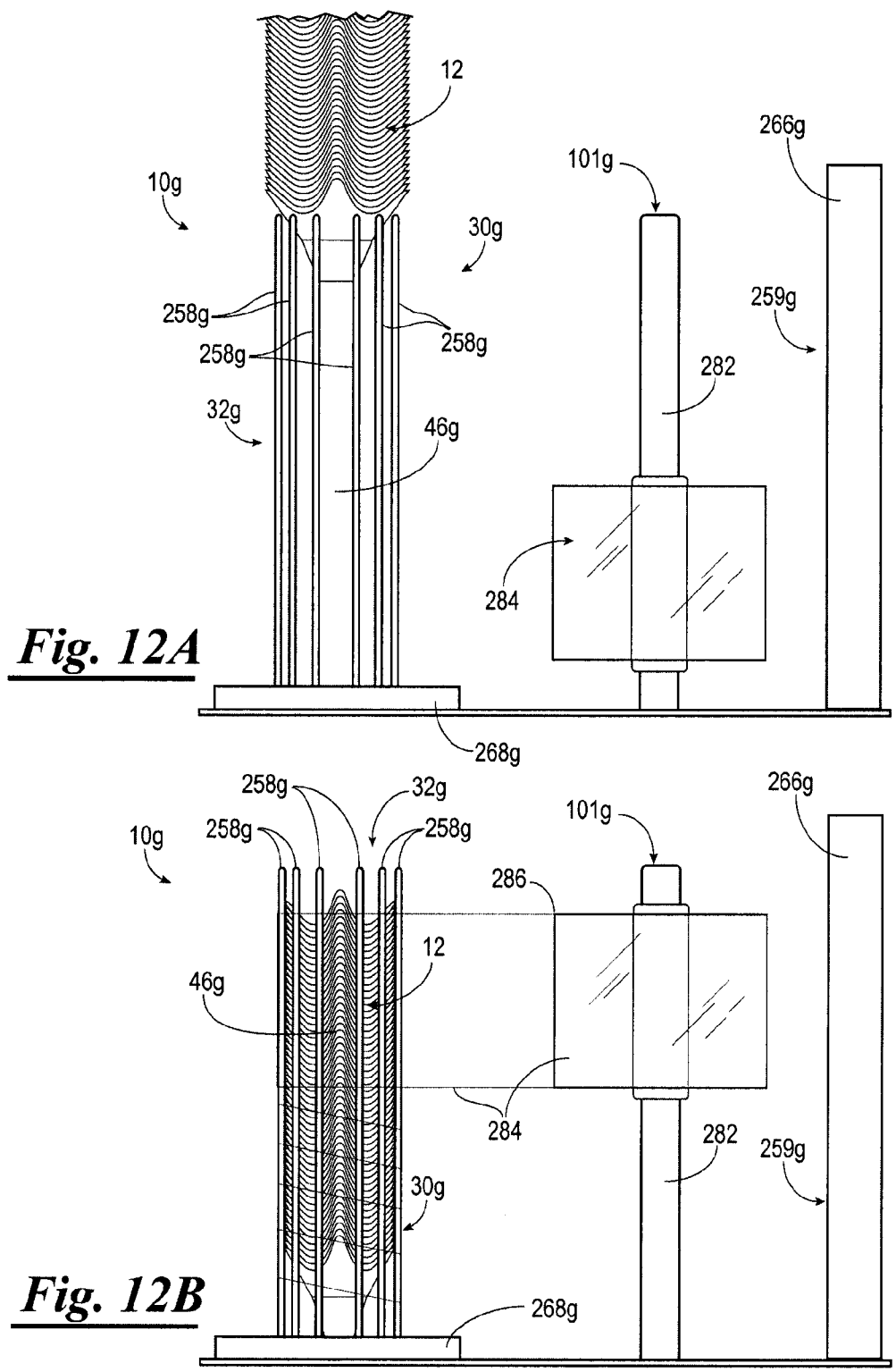
FIGS. 12A-12C are side views of an alternative embodiment of the presently claimed and disclosed inventive concept(s).
Figure 12C:
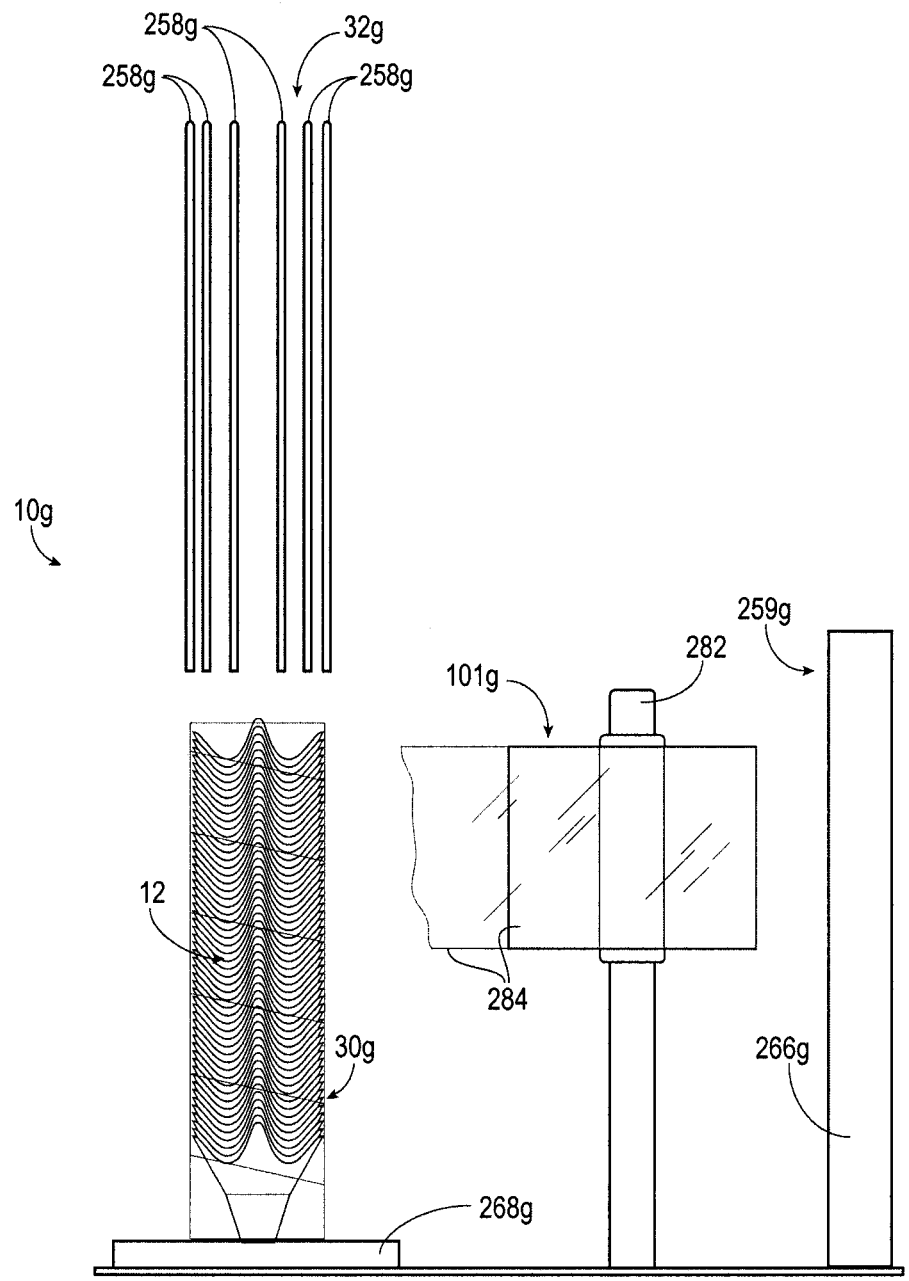

A further embodiment of the presently disclosed and claimed inventive concept(s) is shown in FIGS. 12A-12C, as an article packaging system 10g. The article packaging system 10g includes the plurality of nested plant covers 12, a holding assembly 30g, a support assembly 259g, and a securing assembly 101g. The holding assembly 30g includes a base member 32g having a plurality of supports 258g which are arranged in such a manner so as to provide an inner retaining space 46g. The support assembly 259g includes an upright member 266g and a base 268g. The plurality of supports 258g operably engage the base 268g such that they may be placed into the base 268g, be supported therein and later be removed partially or completely from the base 268g.

The securing assembly 101g includes a spindle 282 and a securing element 284. In the embodiment shown in FIGS. 12A-12C, the securing element 284 is a web of material that is wound around the spindle 282. Alternatively, the securing element 284 may be wound around a spool (not shown) and the spool is thereafter placed on the spindle 282. The web of material can be any material such that the securing element 284 is capable of being wrapped around an object. For example, but not by way of limitation, the web of material may be cling wrap, polymer wrap and/or any other material capable of reversibly or irreversibly bonding to itself. Alternatively, the web of material may be coated with a bonding material as described herein above. Indeed, the web of material may include any material previously disclosed herein for use with any of the embodiments of the presently disclosed and claimed inventive concept(s).

In operation, the plurality of nested plant covers 12 are placed in the inner retaining space 46g that is created by the plurality of supports 258g which are placed into the base 268g of the support assembly 259g. The securing element 284 is thereafter wound about the plurality of supports 258g and thereby squeezing the plurality of nested plant covers 12. The squeezed plurality of nested plant covers 12 occupy space or volume less that the space or volume of the uncompressed plurality of nested plant covers 12. After the securing element 284 is wound around the entirety of the plurality of supports 258g, the securing element 284 is severed or torn along a detachment element 286 which, as shown in FIG. 12B, comprises a series of perforations in the securing element 284. Once the securing element 284 has been severed or torn, the plurality of supports 258g are removed thereby leaving a compressed plurality of nested plant covers 12 occupying substantially less space or volume than an uncompressed plurality of nested plant covers 12.

Changes may be made in the construction and operation of the various components, elements and assemblies described herein or in the steps or sequence of steps of the methods described herein without departing from the spirit and scope of the inventive concept(s) as defined in the following claims.

What is claimed is:

1. A package comprising:
a plurality of compressed flower pot covers, wherein the compressed flower pot covers are in a state substantially compressed from a fully articulated state such that the plurality of nested flower pot covers are compressed along at least one of the width and length thereof and expanded in at least one direction other than the direction of compression.

2. The package of claim 1, further including a holding assembly having a retaining space, wherein the plurality of compressed flower pot covers are located within the retaining space.

3. The package of claim 2, further including means for securing the holding assembly in the state substantially compressed from a fully articulated state.

4. The package of claim 3, wherein the securing means is selected from the group consisting of telescoping cartons, bags, shrink wrap, stretch wrap, bands, tape, adhesive, cohesives, staples, wire, ribbons, string, barbs and combinations thereof.

5. The package of claim 1, further including means for dispensing at least one of the compressed flower pot covers from the package containing the plurality of compressed flower pot covers.

6. The package of claim 1, wherein the compressed flower pot covers in the state substantially compressed from the fully articulated state are compressed to a percentage of the fully articulated state in a range selected from the group consisting of from about 5 to about 10 percent, from about 10 to about 15 percent, from about 15 to about 20 percent, from about 20 to about 25 percent, from about 25 to about 30 percent, from about 30 to about 35 percent, from about 35 to about 40 percent, from about 40 to about 45 percent, from about 45 to about 50 percent, from about 50 to about 55 percent, from about 55 to about 60 percent, from about 60 to about 65 percent, from about 65 to about 70 percent, from about 70 to about 75 percent, from about 75 to about 80 percent, from about 80 to about 85 percent, from about 85 to about 90 percent, from about 90 to about 95 percent and from about 95 to about 99 percent.

7. The package of claim 1, wherein the plurality of flower pot covers are nested.

8. The package of claim 1, wherein the plurality of flower pot covers are substantially unnested.

9. The package of claim 1, further comprising a flower pot cover transport assembly for transporting the plurality of compressed flower pot covers from a first location to a second location, the flower pot cover transport assembly comprising a base member and a lid member, the base member and the lid member being matingly engageable with one another, the base member further including an exterior surface and an interior surface wherein the interior surface defines an inner retaining space sized and shaped so as to be capable of receiving a plurality of nested flower pot covers having a width and a length and wherein the lid member is sized and shaped so as to substantially matingly engage the base member and compress the plurality of flower pot covers along at least one of the width and length of the plurality of flower pot covers while causing expansion of at least a portion of each of the plurality of flower pot covers in at least one direction other than the direction of compression when the transport assembly is in a closed configuration.

10. The package of claim 9, wherein the closed configuration of the transport assembly is of a size insufficient to hold the plurality of flower pot covers in an uncompressed configuration.

11. A method for transporting a plurality of flower pot covers, comprising the steps of:

placing a plurality of flower pot covers having a length and a width in a retaining space of a holding assembly, the holding assembly having an open configuration and a compressed configuration;

compressing the holding assembly having the plurality of flower pot covers disposed therein from the open configuration to the compressed configuration so as to compress the plurality of flower pot covers along at least one of the width and length of the plurality of flower pot covers while causing expansion of at least a portion of each of the plurality of flower pot covers in at least one direction other than the direction of compression; and transporting the plurality of flower pot covers in the carton assembly to a predetermined location.

12. The method of claim 11, wherein the plurality of flower pot covers are further defined as a plurality of nested flower pot covers.

13. A method for transporting a plurality of flower pot covers, comprising the steps of:

placing a plurality of flower pot covers having a width and a length in an inner retaining space of a base member of a carton assembly, wherein the carton assembly is capable of being reversibly articulated from an open configuration to a closed configuration and further having a lid member, an outer surface, and an inner surface that defines the inner retaining space;

compressing the plurality of flower pot covers along at least one of the width and length of the plurality of flower pot covers while causing expansion of at least a portion of each of the plurality of flower pot covers in at least one direction other than the direction of compression;

matingly engaging the lid member with the base member so as to place the carton assembly in the closed configuration; and transporting the plurality of flower pot covers in the carton assembly to a predetermined location.

14. The method of claim 13, wherein the plurality of flower pot covers are further defined as a plurality of nested flower pot covers.

* * * * *